United States Patent
Irvine et al.

(10) Patent No.: US 12,095,798 B1
(45) Date of Patent: Sep. 17, 2024

(54) DETERMINING ADDITIONAL SIGNALS FOR DETERMINING CYBERSECURITY RISK

(71) Applicant: Arceo Labs Inc., San Francisco, CA (US)

(72) Inventors: Ann Irvine, Baltimore, MD (US); Robert Mealey, Baltimore, MD (US); Russell Snyder, Baltimore, MD (US)

(73) Assignee: Arceo Labs Inc., San Francisco, CA (US)

( * ) Notice: Subject to any disclaimer, the term of this patent is extended or adjusted under 35 U.S.C. 154(b) by 546 days.

(21) Appl. No.: 17/342,421

(22) Filed: Jun. 8, 2021

(51) Int. Cl.
*H04L 9/40* (2022.01)
*G06F 18/20* (2023.01)

(52) U.S. Cl.
CPC .......... *H04L 63/1433* (2013.01); *G06F 18/29* (2023.01); *H04L 63/1416* (2013.01); *H04L 63/1425* (2013.01)

(58) Field of Classification Search
CPC ............. H04L 63/1433; H04L 63/1416; H04L 63/1425; G06F 18/29
See application file for complete search history.

(56) References Cited

U.S. PATENT DOCUMENTS

| | | | |
|---|---|---|---|
| 7,885,831 B2 | 2/2011 | Burton | |
| 9,276,951 B2 | 3/2016 | Choi | |
| 9,292,695 B1 * | 3/2016 | Bassett | G06F 21/577 |
| 10,242,202 B1 * | 3/2019 | Erickson | G06F 21/56 |
| 10,469,514 B2 * | 11/2019 | Wang | H04L 63/1433 |
| 2011/0071858 A1 | 3/2011 | Keefer | |
| 2011/0153383 A1 * | 6/2011 | Bhattacharjya | G06Q 10/067 705/348 |
| 2016/0078365 A1 | 3/2016 | Baumard | |
| 2017/0004411 A1 * | 1/2017 | Hassan | G06F 16/2462 |
| 2018/0032736 A1 * | 2/2018 | Inagaki | G06F 3/04817 |
| 2020/0210590 A1 | 7/2020 | Doyle | |
| 2020/0287916 A1 * | 9/2020 | Aksela | H04L 63/1408 |
| 2020/0410001 A1 * | 12/2020 | Sarkissian | G06F 3/0482 |
| 2021/0273973 A1 | 9/2021 | Boyer | |
| 2021/0281583 A1 | 9/2021 | Okunlola | |

OTHER PUBLICATIONS

Chris Hedenberg, "(Re) Building a Ransomware Risk Score for the Future", Sorvus Insurance Holdings, Inc., Feb. 3, 2021, https://www.corvusinsurance.com/blog/re-building-a-ransomware-risk-score-for-the-future.

* cited by examiner

*Primary Examiner* — Kambiz Zand
*Assistant Examiner* — Afaq Ali
(74) *Attorney, Agent, or Firm* — Van Pelt, Yi & James LLP

(57) ABSTRACT

Determining additional signals for determining cybersecurity risk is disclosed, including: obtaining signals associated with a cybersecurity risk, wherein the obtained signals include technographic signals and query derived signals obtained from queries; combining the technographic signals and the query derived signals into a Bayesian model indicating the cybersecurity risk; and determining additional technographic signals or additional query derived signals associated with the cybersecurity risk to obtain such that the additional technographic signals or the additional query derived signals are to be computed to impact the cybersecurity risk.

20 Claims, 18 Drawing Sheets

|         |            | Prepared? |      |
|---------|------------|-----------|------|
| Training? | Click Rate | Yes     | No   |
| Yes     | Excellent  | 0.95      | 0.05 |
| Yes     | Good       | 0.9       | 0.10 |
| Yes     | Fair       | 0.7       | 0.3  |
| Yes     | Poor       | 0.5       | 0.5  |
| No      | Excellent  | 0.85      | 0.15 |
| No      | Good       | 0.75      | 0.25 |
| No      | Fair       | 0.4       | 0.6  |
| No      | Poor       | 0.3       | 0.7  |

FIG. 10B

|  | Training = Yes (0.5, 1) | Click Rate = Excellent (0.75, 1) | μ_sample (weighted mean, w_1 = 1, w_2 = 2) | p (prepared = yes) | p (prepared = no) |
|---|---|---|---|---|---|
| s_1 | 0.5 | 0.75 | 0.67 | 0.96 | 0.04 |
| s_2 | 0.5 | 0.875 | 0.75 | 0.99 | 0.01 |
| s_3 | 0.5 | 1 | 0.83 | 1 | 0.00 |
| s_4 | 0.75 | 0.75 | 0.75 | 0.99 | 0.01 |
| s_5 | 0.75 | 0.875 | 0.83 | 1 | 0.00 |
| s_6 | 0.75 | 1 | 0.92 | 1 | 0.00 |
| s_7 | 1 | 0.75 | 0.83 | 1 | 0.00 |
| s_8 | 1 | 0.875 | 0.92 | 1 | 0.00 |
| s_9 | 1 | 1 | 1 | 1 | 0.00 |

FIG. 10D

| Training? | Click Rate | Prepared? | |
|---|---|---|---|
| | | Yes | No |
| Yes | Excellent | 0.99 | 0.01 |

FIG. 10E

DETERMINING ADDITIONAL SIGNALS FOR DETERMINING CYBERSECURITY RISK

BACKGROUND OF THE INVENTION

There are many challenges in the analysis of a security risk for an organization (e.g., an enterprise). First, in a comprehensive analysis of the security risk, disparate types of data are needed to be collected for the organization. However, it is difficult to integrate disparate types of data in a unified manner. Second, there is an asymmetry of information that is available for different organizations and therefore, it is challenging to contextualize the security risk of one organization with the security risk of another organization. Third, circumstances around the security risk of an organization may change over time and it can be labor intensive to track the organization's evolving security precautions over time to ascertain the organization's risk.

BRIEF DESCRIPTION OF THE DRAWINGS

Various embodiments of the invention are disclosed in the following detailed description and the accompanying drawings.

FIG. 10B shows an example of a conditional probability table for the assessment node, "Prepared for Phishing Attacks?".

FIG. 10D shows example tables that include the weighted means computed for various samples of the probabilities corresponding to a combination of two possible signal input values for the "Prepared for Phishing Attacks?" assessment node and the corresponding computed probabilities of the assessment node values.

FIG. 10E shows an example of computing the simple average of the probabilities across all samples, which yields the row in the initial target conditional probability table.

DETAILED DESCRIPTION

Figure 1:
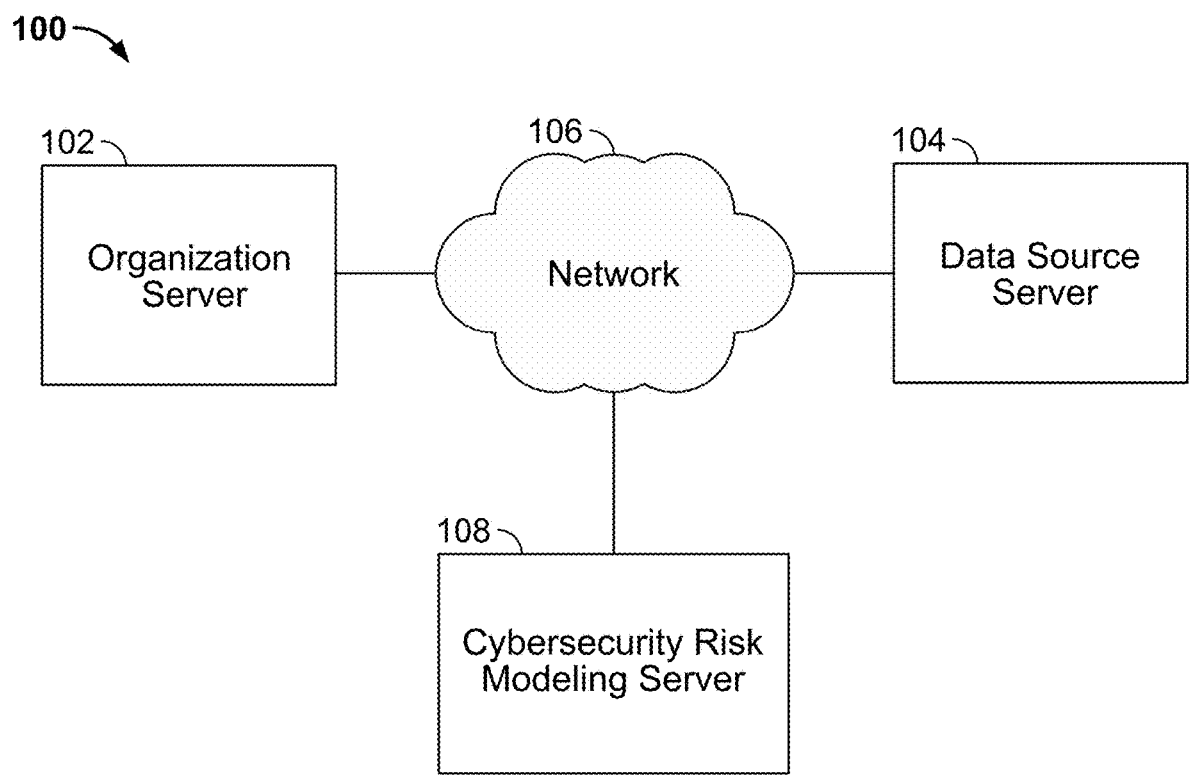
FIG. 1 is a diagram showing an embodiment of a system for generating a model for a cybersecurity risk.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of determining additional signals for determining cybersecurity risk are described herein. Signals associated with a cybersecurity risk are obtained. In various embodiments, a "cybersecurity risk" comprises a probability of a particular type of cyber incident (e.g., a breach or an attack) on information (e.g., web) assets as well as the probability of resulting losses (e.g., financial or reputation). In various embodiments, a "signal" comprises a specific type of data point and a set of probabilities corresponding to a set of possible input values for that data point. The obtained signals include technographic signals and query derived signals obtained from queries. In various embodiments, the "technographic signals" comprise signals that are obtained via programmatic querying of data source servers (e.g., via application programming interface (API)). In various embodiments, the "query derived signals" comprise signals that are obtained from queries (e.g., surveys, forms, questionnaires, interviews) that have been completed by a user associated with the organization. The obtained technographic signals and the query derived signals are combined into a Bayesian model indicating the cybersecurity risk. As will be described in further detail below, a set of related signals can be combined to obtain an assessment node in the Bayesian model. Additional signals and/or assessment nodes can be combined into further assessment nodes. Two or more assessment nodes can in turn be combined to obtain the cybersecurity risk. Additional technographic signals or additional query derived signals associated with the cybersecurity risk to obtain are determined such that the additional technographic signals or the additional query derived signals are to be computed to impact the cybersecurity risk. In some embodiments, the additional technographic signals or additional query derived signals associated with the cybersecurity risk to obtain are determined given the existing technographic signals and/or query derived signals that have already been received.

Embodiments of generating a cybersecurity risk model using sparse data are described herein. Signals associated with a cybersecurity risk are obtained. The obtained signals include technographic signals and query derived signals obtained from queries. Pseudo signals are determined based at least in part on a priori factors relating to the cybersecurity risk. In various embodiments, the "pseudo signals" comprise signals that could not be obtained as technographic signals or query derived signals and instead are determined to be possible input values with corresponding probabilities that are determined based on a priori factors. The pseudo signals, the obtained query derived signals, and the obtained technographic signals are combined into a Bayesian model indicating the cybersecurity risk.

FIG. 1 is a diagram showing an embodiment of a system for generating a model for a cybersecurity risk. In the example of FIG. 1, system 100 includes organization server 102, data source server 104, network 106, and cybersecurity risk modeling server 108. Network 106 includes data networks and/or telecommunications networks.

Cybersecurity risk modeling server 108 is configured to receive an indication to model one or more cybersecurity risks corresponding to an organization's information assets. For example, the organization comprises an enterprise. Examples of an organization's information assets include the organization website(s), cloud storage, employee workstations, information technology applications (e.g., email servers), customer data storage, financial data, and proprietary data (e.g., code). To generate a model corresponding to each cybersecurity risk associated with the organization, cybersecurity risk modeling server 108 is configured to obtain a set of signals corresponding to that particular cybersecurity risk. In some embodiments, for each cybersecurity risk, there is a predetermined set of signals corresponding to that cybersecurity risk that is to be obtained for an organization and used to model the cybersecurity risk for that organization. Of the set of (e.g., predetermined) set of signals to obtain corresponding to a cybersecurity risk, cybersecurity risk modeling server 108 is configured to obtain at least some of those signals as "technographic signals," which are signals that can be obtained programmatically by cybersecurity risk modeling server 108. In some embodiments, cybersecurity risk modeling server 108 can obtain technographic signals corresponding to a cybersecurity risk for an organization by querying (e.g., using an application programming interface (API)) a server associated with the organization itself (organization server 102) and/or by querying a third-party server such data source server 104. For example, if data source server 104 provided an index/ranking of the websites with the most traffic, then cybersecurity risk modeling server 108 could query that server to obtain the traffic index/ranking corresponding to an organization as a technographic signal for that organization. Of the set of (e.g., predetermined) signals to obtain corresponding to a cybersecurity risk, cybersecurity risk modeling server 108 is configured to obtain at least some of those signals as "query derived signals," which are signals that are derived from query responses provided by the organization. For example, those signals that cannot be obtained as technographic signals (e.g., those signals that cannot be obtained by an API) are instead pulled manually, using a trained machine learning model, and/or using programmatic character recognition by cybersecurity risk modeling server 108 from the forms, surveys, or other questionnaires that have been (e.g., provided by cybersecurity risk modeling server 108 and) completed by one or more representative users of the organization.

In some embodiments, each of a technographic signal that is successfully programmatically obtained from a data source (e.g., data source server 104) and a query derived signal that is successfully derived from a query comprises a distribution of probabilities across a set of possible input values corresponding to that signal. In some embodiments, the set of possible input values corresponding to a technographic signal or a query derived signal can be predetermined or dynamically determined. For example, for certain signals, their sets of possible input values are predetermined while for other signals, their sets of possible input value can be dynamically determined by their respective data sources. To take query derived signals as an example, the difference of having predetermined possible input values and dynamically determined possible input values is similar to the difference between a multiple-choice question on a questionnaire and a free form text type of question. The same distinction also applies to technographic signals as well. For signals with dynamic sets of possible input values, the obtained values can be programmatically "bucketed" into a predefined set of input value "buckets." An example of a signal with a dynamic set of possible input values is company location. Because it may be impractical to enumerate every single zip code or state or country that an organization could claim as its physical location, an obtained location value can be programmatically (e.g., using additional mapping APIs) assigned into a corresponding signal bucket that may, for example, correspond to a continent or region of the world. Depending on the certainty with which a signal can be obtained, the distribution of probabilities may include a probability of 1.0 for a single input value and probabilities of 0 for the other possible input values or the distribution of probabilities could include a non-zero probability for each of two or more possible input values. For example, for the signal of "Data storage encrypted?," the possible input values are "Yes" and "No." In the event that the signal of "Data storage encrypted?" can be successfully obtained with high certainty as either a technographic or a query derived signal by cybersecurity risk modeling server 108 with respect to a given organization, then the obtained "Data storage encrypted?" signal could have a probability of 1.0 corresponding to whichever of "Yes" or "No" has been determined with certainty. However, in the event that the signal of "Data storage encrypted?" can be successfully obtained but with less certainty as either a technographic or a query derived signal by cybersecurity risk modeling server 108 with respect to a given organization, then the obtained "Data storage encrypted?" signal could have non-zero probabilities corresponding to both of "Yes" or "No" to represent the uncertainty with the obtained signal or the data source from which the signal was obtained. Alternatively, in the event of a scenario in which an organization has partially encrypted their data (e.g., maybe one data storage system is encrypted and another is not), a non-zero probability can be associated with each of possible input values "Yes" and "No" of the "Data storage encrypted?" signal. For example, a probability of 0.6 can be assigned to the "Yes" input value and a probability of 0.4 can be assigned to the "No" input value for the "partially encrypted" data storage scenario. Put another way, the probability representation associated with possible input values of a signal is the same for (a) partial answers, and (b) uncertainty.

In various embodiments, in the event that fewer than all of a (e.g., predetermined) set of signals to obtain corresponding to a cybersecurity risk can be obtained by cybersecurity risk modeling server 108 as either technographic signals or as query derived signals for an organization, cybersecurity risk modeling server 108 is configured to determine additional technographic signals or query derived signals that could impact the cybersecurity risk, to obtain. In some embodiments, cybersecurity risk modeling server 108 is configured to determine which additional signals to obtain based on factors such as, for example, but not limited to: the type of cybersecurity risk that is to be used to model, the type of organization for which the cybersecurity risk is to be modeled, and a weight/influence/impact the additional signals are to have on the cybersecurity risk that they will be used to model. In some embodiments, cybersecurity risk modeling server 108 is configured to rank the determined additional signals to obtain for a cybersecurity risk corresponding to an organization based on the additional signals' corresponding weight/influence/impact (e.g., as assigned by experts and/or historical observation) and attempt to obtain a subset of the highest ranked determined additional signals as whichever one of technographic signals or query derived signals that can be successfully obtained. For example, there is a constrained window of time (e.g., as set by the organization) to obtain these additional signals and as such, it is desirable to rank the determined additional signals to obtain such that obtaining the most impactful (on the modeling of the cybersecurity risk) signals, within the time constraint, can be prioritized over other comparatively less impactful signals.

In various embodiments, cybersecurity risk modeling server 108 is configured to generate "pseudo signals" to model a cybersecurity risk corresponding to an organization, along with received/obtained technographic signals and query derived signals corresponding to the cybersecurity risk corresponding to the organization. In various embodiments, cybersecurity risk modeling server 108 is configured to generate a "pseudo signal" corresponding to the cybersecurity risk corresponding to the organization in the event that a predetermined signal to obtain cannot be successfully obtained as either a technographic signal or as a query derived signal. For example, a predetermined signal to obtain cannot be obtained as a technographic signal because a data source is not available/is not responsive/is not able to provide the signal for cybersecurity risk modeling server 108. In another example, a signal cannot be obtained as a query derived signal because the query responses provided by the organization did not include that signal. In various embodiments, cybersecurity risk modeling server 108 is configured to generate a "pseudo signal" in place of an unavailable signal corresponding to the cybersecurity risk for the given organization using a priori factors corresponding to that cybersecurity risk. Examples of a priori factors that can be used to determine each pseudo signal include expert defined probabilities corresponding to the set of possible input values corresponding to the signal, historical probabilities corresponding to the set of possible input values corresponding to the signal, the type of organization for which cybersecurity risk is being modeled, and the values associated with other technographic or query signals that were already collected. As such, a pseudo signal comprises a generated distribution of probabilities corresponding to the set of possible input values associated with that signal.

Cybersecurity risk modeling server 108 is configured to combine the obtained technographic signals, the obtained query derived signals, and the generated pseudo signals (if any) corresponding to a cybersecurity risk of an organization to generate a Bayesian probabilistic model for that cybersecurity risk. As will be described in further detail below, the Bayesian probabilistic model for that cybersecurity risk has a tree-structure, where signals form the leaf nodes (signals) of the tree-structure and are then combined into assessment nodes, which may or may not be combined again, to ultimately form the root scenario node, which represents a probability corresponding to the likelihood that the cybersecurity risk would occur for the organization. In some embodiments, cybersecurity risk modeling server 108 is configured to determine sets of two or more related signals (e.g., based on predetermined relationships between signals) corresponding to the cybersecurity risk and then combine each set of related signals into a corresponding (mid-level) "assessment node." In various embodiments, an "assessment node" comprises a data point that is determined as a probabilistic function of two or more signals or lower-level assessment nodes. In various embodiments, an assessment node comprises a distribution of probabilities corresponding to a set of possible assessment values. In some embodiments, cybersecurity risk modeling server 108 is configured to then combine sets of two or more related assessment nodes (e.g., based on predetermined relationships between assessment nodes) into additional assessment nodes. In some embodiments, cybersecurity risk modeling server 108 is configured to eventually combine the highest-level assessment nodes into a root scenario node. In some embodiments, cybersecurity risk modeling server 108 is configured to output the generated model of a cybersecurity risk corresponding to an organization at a user interface. In some embodiments, cybersecurity risk modeling server 108 is configured to (e.g., periodically or in response to a user instruction) obtain updated signals (e.g., updated distributions of probabilities corresponding to the set of possible input values) corresponding to the cybersecurity risk, over time, as technographic signals, query derived signals, and pseudo signals and use the updated signals to generate updated models of the cybersecurity risk.

As described for system 100 as shown in FIG. 1 and will be illustrated in examples described further below, various embodiments describe techniques for combining disparate types of signals (e.g., technographic, query derived, pseudo signals) to generate a more complete model of a cybersecurity risk for a given organization. Furthermore, various embodiments describe identifying (e.g., the most impactful) of remaining signals to obtain to model the cybersecurity risk so that the resulting model can be the most accurate given the signals that were able to be obtained. Moreover, a signal that cannot be successfully obtained as either a technographic signal or as a query derived signal (e.g., for a given organization or at a given time) can be generated as a pseudo signal to avoid the data sparseness issue that may arise from modeling the cybersecurity risk. All signals that are used to model the cybersecurity risk can also be updated over time to ensure that the resulting model for the cybersecurity risk is up to date.

Figure 2:
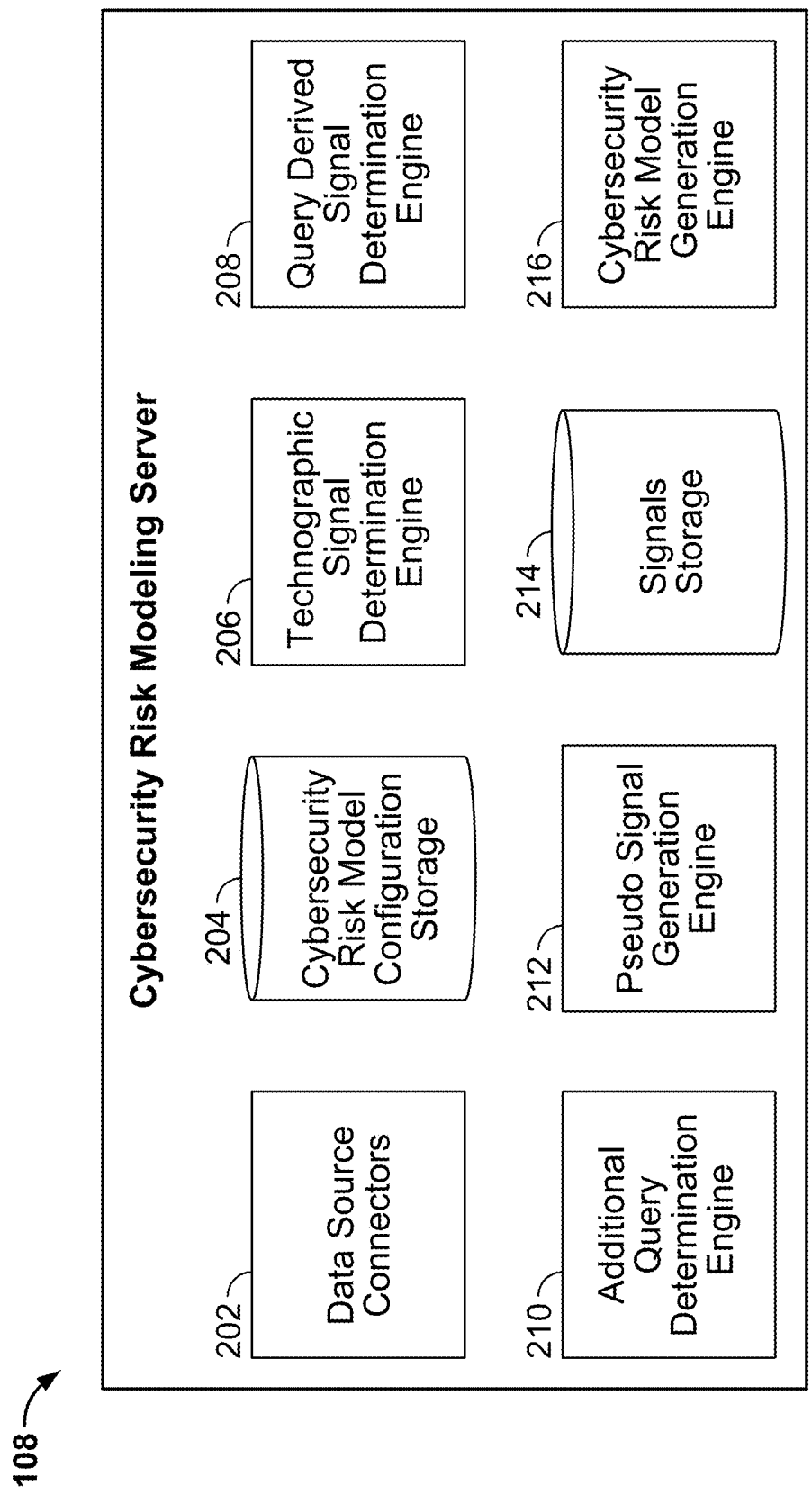
FIG. 2 is a diagram showing an example of a cybersecurity risk modeling server.

FIG. 2 is a diagram showing an example of a cybersecurity risk modeling server. In some embodiments, cybersecurity risk modeling server 108 of system 100 of FIG. 1 may be implemented using the example shown in FIG. 2. In the example of FIG. 2, the cybersecurity risk modeling server includes data source connectors 202, cybersecurity risk model configuration storage 204, technographic signal determination engine 206, query derived signal determination engine 208, additional query determination engine 210, pseudo signal generation engine 212, signals storage 214, and cybersecurity risk model generation engine 216. Each of cybersecurity risk model configuration storage 204 and signals storage 214 can be implemented using one or more databases and/or one or more types of storage media. Each of data source connectors 202, technographic signal determination engine 206, query derived signal determination engine 208, additional query determination engine 210, pseudo signal generation engine 212, and cybersecurity risk model generation engine 216 can be implemented using software and/or hardware.

Technographic signal determination engine 206 is configured to obtain technographic signals for modeling one or more cybersecurity risks associated with one or more organizations. In some embodiments, for a particular cybersecurity risk, technographic signal determination engine 206 is configured to look up a set of configuration information for that cybersecurity risk from cybersecurity risk model configuration storage 204. For example, the set of configuration information for modeling a cybersecurity risk may include a predetermined set of signals to use to model that cybersecurity risk, whether a signal should be obtained as a technographic signal and/or as a query derived signal, the predetermined relationships among the nodes (signals/assessment nodes) of the model, an impact weight associated with each signal/assessment node of the model, attributes associated with each signal (e.g., whether the signal is a micro signal or a macro signal), which assessment nodes to be derived from which signals or which other assessment nodes, the set of possible input values corresponding to teach signal/assessment node, and which assessment nodes are to be combined to obtain the scenario node. From the set of predetermined signals to obtain for that cybersecurity risk, technographic signal determination engine 206 is configured to determine the subset of those signals that could be obtained as technographic signals (based on the configuration information) and the data source servers from which to obtain that subset of signals. Technographic signal determination engine 206 is then configured to use the appropriate data source connectors from data source connectors 202 to query the respective data source servers to obtain the technographic signals for the cybersecurity risk for the given organization. Technographic signal determination engine 206 is configured to store the obtained technographic signals corresponding to a cybersecurity risk associated with an organization at signals storage 214. In some embodiments, in the event that technographic signal determination engine 206 is not able to obtain a signal as a technographic signal (e.g., because the queried data source server was not responsive or did not provide queried signal) or the technographic signal value obtained is not high confidence (e.g., probabilities associated with multiple possible signal values are non-zero), technographic signal determination engine 206 is configured to inform additional query determination engine 210 and/or pseudo signal generation engine 212 of the failure to obtain that signal.

Query derived signal determination engine 208 is configured to obtain query derived signals for modeling one or more cybersecurity risks associated with one or more organizations. In some embodiments, for a particular cybersecurity risk, query derived signal determination engine 208 is configured to look up a set of configuration information, as described above, for that cybersecurity risk from cybersecurity risk model configuration storage 204. From the set of predetermined signals to obtain for that cybersecurity risk, query derived signal determination engine 208 is configured to obtain the subset of signals that is designated to be obtained as query derived signals from one or more questionnaires/forms/surveys/interviews that have been completed by an organization. For example, query derived signals can be derived from values that have been input into an online form, values that have been output by a character recognition process based on scanned images/text, selections of responses made at a webpage, outputs from trained machine learning models, and/or information provided in interviews with representatives from the organization. Query derived signal determination engine 208 is configured to store the obtained query derived signals corresponding to a cybersecurity risk associated with an organization at signals storage 214. In some embodiments, in the event that query derived signal determination engine 208 is not able to obtain a signal as a query derived signal (e.g., because the questionnaires/forms/surveys/interviews did not include the signal), query derived signal determination engine 208 is configured to inform additional query determination engine 210 and/or pseudo signal generation engine 212 of the failure to obtain that signal.

Additional query determination engine 210 is configured to determine additional queries to obtain to model one or more cybersecurity risks associated with one or more organizations. In some embodiments, for a particular cybersecurity risk associated with a given organization, additional query determination engine 210 is configured to identify a set of additional signals either as technographic signals or query derived signals based on which technographic signals and query derived signals have already been obtained (e.g., by technographic signal determination engine 206 and query derived signal determination engine 208). In a first example, for a signal that was attempted to be obtained as a technographic signal but was not successfully obtained as a technographic signal, additional query determination engine 210 is configured to determine to obtain that signal as a query derived signal. In a second example, the set of configuration information associated with the cybersecurity risk includes data dependencies between signals such that additional query determination engine 210 can determine additional signals to obtain given that the signals on which they depend have already been successfully obtained. In a third example, after at least some obtained signals are combined to obtain assessment nodes, additional query determination engine 210 is configured to determine additional signals to obtain based on the determined assessment nodes. In a fourth example, a signal that has already been "obtained" as a technographic signal but with low confidence (e.g., several possible input values have non-zero probabilities) can be identified by additional query determination engine 210 to obtain again but as an additional query derived signal (e.g., via using a questionnaire/survey). In some embodiments, additional query determination engine 210 is configured to rank the additional signals to obtain based on their respective impact/weight/influence. For example, the respective impacts of signals can be determined as a function of the predetermined (e.g., by experts or based on historical impact) impact weights of the signal, the type of the cybersecurity risk, and/or the type of the organization. One reason to rank the determined additional signals is so that additional signals that will have a greater impact on the cybersecurity risk can be prioritized to be obtained first where there is a constraint on time to obtain the signals or a constraint on another resource (e.g., the number of times that certain data source servers can be queried). In some embodiments, additional query determination engine 210 is configured to instruct technographic signal determination engine 206 and query derived signal determination engine 208 to respectively obtain identified technographic signals and query derived signals (e.g., in a sequence based on the determined rankings of the signals).

Pseudo signal generation engine 212 is configured to generate signals to model one or more cybersecurity risks associated with one or more organizations. In some embodiments, for a particular cybersecurity risk associated with a given organization, pseudo signal generation engine 212 is configured to generate pseudo signals in place of signals that could not be obtained as either a technographic signal or as a query derived signal. In some embodiments, pseudo signal generation engine 212 is configured to receive from technographic signal determination engine 206 and query derived signal determination engine 208 indications of signals that either engine could not obtain and based on that information, pseudo signal generation engine 212 is configured to generate each of at least some such unavailable signals as a pseudo signal. In some embodiments, pseudo signal generation engine 212 is configured to generate pseudo signals for signals, which are predetermined to be obtained in accordance with a set of configuration information associated with the cybersecurity risk model, for which neither technographic signal determination engine 206 nor query derived signal determination engine 208 were able to successfully obtain. In various embodiments, pseudo signal generation engine 212 is configured to generate each pseudo signal corresponding to a cybersecurity risk associated with an organization based on a priori factors pertaining to that cybersecurity risk and/or organization. In a first example, a pseudo signal can be a distribution of expert defined probabilities corresponding to a set of possible input values associated with the signal. In a second example, a pseudo signal can be a distribution of historical probabilities corresponding to a set of possible input values associated with the signal and where the historical probabilities are determined based on those of organizations similar to the organization for which the pseudo signal is being generated. Pseudo signal determination engine 212 is configured to store the generated pseudo signals corresponding to a cybersecurity risk associated with an organization at signals storage 214.

Cybersecurity risk model generation engine 216 is configured to generate a model corresponding to each cybersecurity risk associated with each organization based on the determined signals (e.g., stored at signals storage 214). In some embodiments, the model corresponding to a cybersecurity risk associated with an organization is a Bayesian probabilistic model, meaning that the determined signals are fed into the tree-structured model as inputs/leaf nodes and are combined to model the nodes of each level of the model that is above the leaf nodes. In some embodiments, cybersecurity risk model generation engine 216 is configured to determine sets of obtained signals that are related from signals storage 214 for a cybersecurity risk associated with an organization (e.g., based on predetermined signal relationships that are described in the set of configuration information associated with the cybersecurity risk). Cybersecurity risk model generation engine 216 is then configured to combine the distributions of probabilities corresponding to the sets of possible input values of the related signals to obtain an assessment node that comprises a determined distribution of probabilities corresponding to a set of possible assessment values. In some embodiments, cybersecurity risk model generation engine 216 is configured to determine sets of assessment nodes that are related for a cybersecurity risk associated with an organization (e.g., based on predetermined assessment relationships that are described in the set of configuration information associated with the cybersecurity risk) to obtain additional assessment nodes in the model or the scenario node at the root of the model. As mentioned above, the scenario node represents the cybersecurity risk and comprises at least a probability that the exposure/breach/attack is to occur for the given organization. In some embodiments, cybersecurity risk model generation engine 216 is configured to output, at a user interface, the generated model corresponding to the cybersecurity risk associated with the organization. For example, in the user interface, different signals and assessment nodes of the model can be presented with an appearance (e.g., in size and/or color) that is determined based on one or more of the following: the (e.g., a micro or macro) type associated with the signal/assessment node; the impact associated with the assess node; and whether the signal was determined as a technographic signal, a query derived signal, or as a pseudo signal. In some embodiments, cybersecurity risk model generation engine 216 is configured to (e.g., periodically or in response to a user instruction) update a generated model corresponding to the cybersecurity risk associated with the organization based on updated signals.

Figure 3:
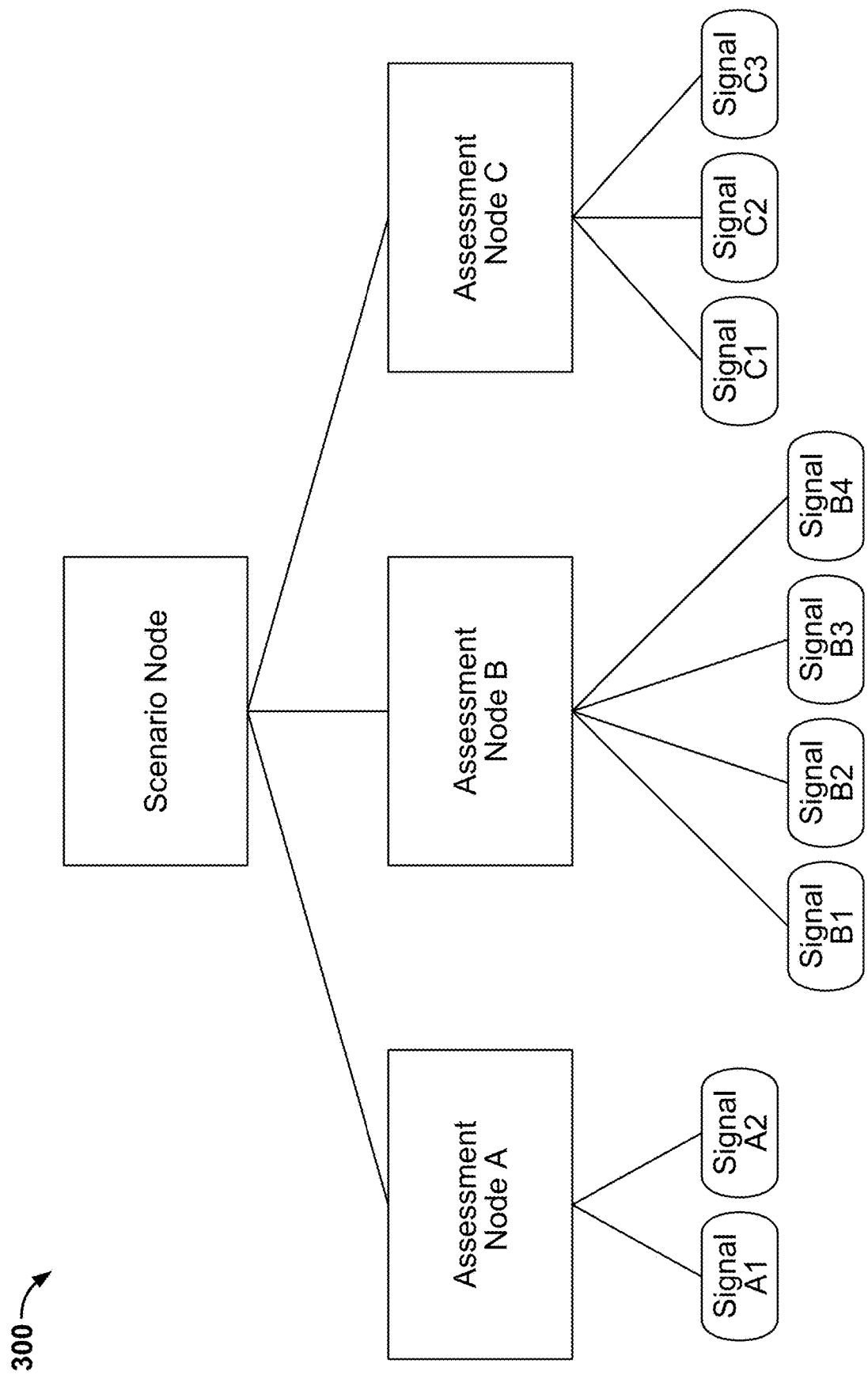
FIG. 3 is a diagram showing an example of a generated model of a cybersecurity risk associated with an organization.

FIG. 3 is a diagram showing an example of a generated model of a cybersecurity risk associated with an organization. Model 300 shows a simple tree-structure and also example relationships among signal nodes (which are also simply called "signals"), assessment nodes, and the scenario node. For example, a set of configuration information associated with the cybersecurity risk described the signals (Signals A1, A2, B1, B2, B3, B4, C1, C2, and C3) that can be included in the model for the cybersecurity risk. Based on the set of configuration information, Signals A1, A2, B1, B2, B3, B4, C1, C2, and C3 were then obtained as either technographic signals or query derived signals, or generated as pseudo signals. Furthermore, the set of configuration information described that Signals A1 and A2 should be combined to obtain Assessment Node A, that Signal B1, B2, B3, and B4 should be combined to obtain Assessment Node B, and that Signals C1, C2, and C3 should be combined to obtain Assessment Node C. After Assessment Nodes A, B, and C are obtained from the respective signals, the assessment nodes are then combined, based on the set of configuration information, to obtain Scenario Node, which is the root of the tree-structured model and also represents the cybersecurity risk (i.e., the probability that the given organization experiences a particular breach/attack/exposure) that is modeled by model 300. As shown in the example of FIG. 3, signals pertaining to the cybersecurity risk are obtained and then enter the tree-structured model from the bottom. The obtained signals are combined to form assessment nodes, which are ultimately combined to determine the scenario node, which represents the probability that the given organization experiences a particular breach/attack/exposure. Put another way, by combining the nodes, levelby-level, starting from the leaf nodes of the tree-structure, the root scenario node is determined as a function of all the obtained signals and their higher-level assessment nodes.

Figure 4:
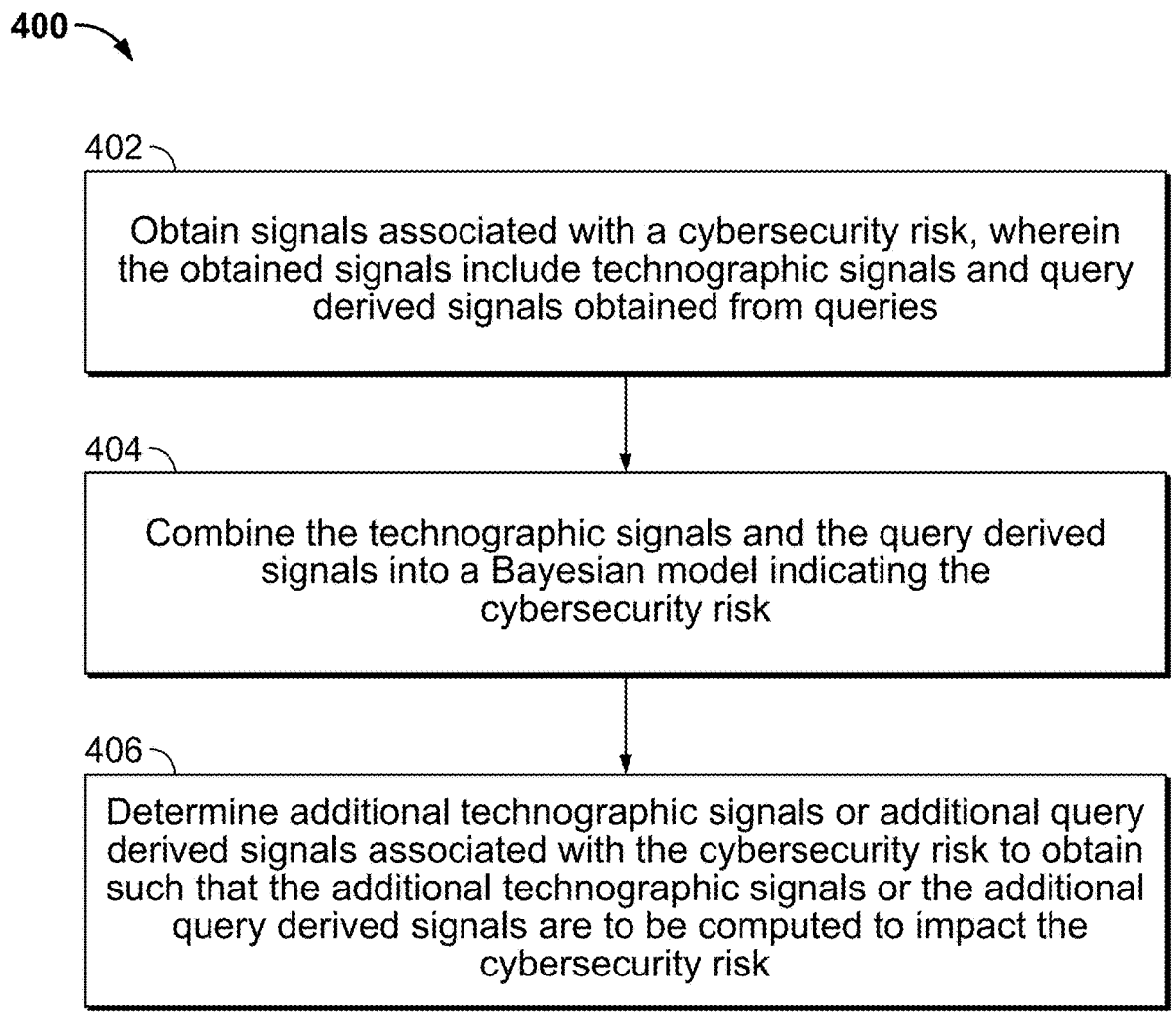
FIG. 4 is a flow diagram showing an embodiment of a process for determining additional signals for modeling a cybersecurity risk.

FIG. 4 is a flow diagram showing an embodiment of a process for determining additional signals for modeling a cybersecurity risk. In some embodiments, process 400 is implemented by cybersecurity risk modeling server 108 of system 100 of FIG. 1.

At 402, signals associated with a cybersecurity risk are obtained, wherein the obtained signals include technographic signals and query derived signals obtained from queries. The technographic signals and query derived signals associated with the cybersecurity risk are obtained for a given organization.

At 404, the technographic signals and the query derived signals are combined into a Bayesian model indicating the cybersecurity risk. Related technographic signals and query derived signals can be combined into a corresponding assessment node. In some embodiments, combining signals into a corresponding assessment node comprises using the respective distributions of probabilities corresponding to the sets of possible input values of the signals to determine a set of probabilities corresponding to possible assessment values associated with the assessment node. Two or more assessment nodes, derived from the signals, are then combined to obtain the scenario node, which represents the cybersecurity risk. Specifically, the scenario node comprises a probability that a particular exposure/attack/breach could occur for the given organization.

At 406, additional technographic signals or additional query derived signals associated with the cybersecurity risk are determined to be obtained such that the additional technographic signals or the additional query derived signals are to be computed to impact the cybersecurity risk. For example, the additional technographic signals or additional query derived signals are determined based on which signals have already been obtained, one or more assessment nodes that have been determined from obtained signals, and/or the set of configuration information associated with the cybersecurity risk. In some embodiments, the additional technographic signals or additional query derived signals are ranked by their respective impact weights. The ranked additional technographic signals or additional query derived signals to obtain are then obtained in a sequence that is determined based on their respective rankings. For example, an additional signal to obtain that is ranked higher (e.g., has a greater impact weight) than another additional signal to obtain that ranked lower (e.g., has a lower impact weight) is obtained earlier than the other signal. The obtained additional signals are added to the model of the cybersecurity risk to affect the computation of the scenario node (i.e., the probability that the particular exposure/attack/breach could occur).

Figure 5:
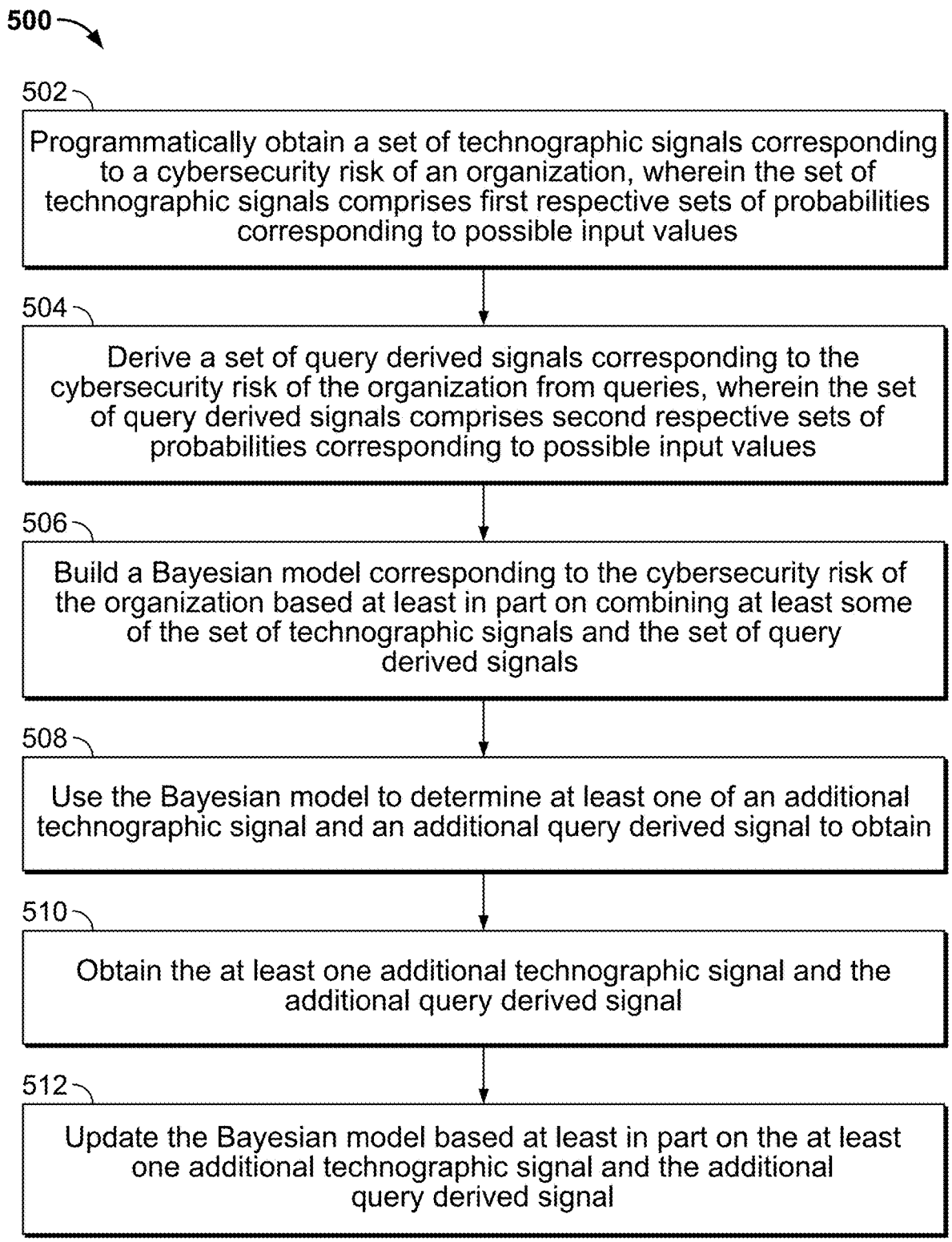
FIG. 5 is a flow diagram showing an example of a process for determining additional signals for modeling a cybersecurity risk associated with an organization.

FIG. 5 is a flow diagram showing an example of a process for determining additional signals for modeling a cybersecurity risk associated with an organization. In some embodiments, process 500 is implemented by cybersecurity risk modeling server 108 of system 100 of FIG. 1. In some embodiments, process 400 of FIG. 4 may be implemented, at least in part, by process 500.

At 502, a set of technographic signals corresponding to a cybersecurity risk of an organization is programmatically obtained, where the set of technographic signals comprises a first respective sets of probabilities corresponding to possible input values. As described, each obtained technographic signal comprises a set/distribution of probabilities that the signal is any one of a corresponding set of possible input values. For example, the probability that is assigned to each possible input value for a technographic signal can be determined by the data source server from which the technographic signal was obtained or by the cybersecurity risk modeling server based on a predetermined uncertainty associated with that data source server.

At 504, a set of query derived signals corresponding to the cybersecurity risk of an organization is derived from queries, where the set of query derived signals comprises a second respective sets of probabilities corresponding to possible input values. As described, each obtained query derived signal comprises a set/distribution of probabilities that the signal is any one of a corresponding set of possible input values. For example, the probability that is assigned to each possible input value for a query derived signal can be determined by the cybersecurity risk modeling server based on a predetermined uncertainty associated with that type of signal.

At 506, a Bayesian model corresponding to the cybersecurity risk of the organization is built based at least in part on combining at least some of the set of technographic signals and the set of query derived signals. As described above, two or more related signals (e.g., based on predetermined relationships between signals as described in the set of configuration information) can be combined using their respective sets of probabilities corresponding to input values to obtain an assessment node of the Bayesian probabilistic model for the cybersecurity risk. A technographic signal can be combined with another technographic signal or with a query derived signal to obtain an assessment node. In some instances, two or more related assessment nodes can be combined into additional assessment nodes in the model. Ultimately, the highest-level assessment nodes of the model are combined to obtain the scenario node, which is the root of the tree-structure of the model and represents the probability that a particular exposure/attack/breach could occur for the given organization.

At 508, the Bayesian model is used to determine at least one of an additional technographic signal and an additional query derived signal to obtain. The already obtained signals and/or assessment nodes of the model can be used to determine one or more additional technographic signals and additional query derived signals to obtain. In some embodiments, the additional technographic signals and additional query derived signals to obtain are ranked based on their respective impact weights. In some embodiments, a signal that has already been "obtained" as either a query derived signal or as a technographic signal but with low confidence (e.g., several possible input values have non-zero probabilities) can be identified by the Bayesian model as a signal to be obtained again as an additional signal. As an example, the probabilities associated with the possible input values associated with an obtained technographic signal are associated with a confidence that is less than a predetermined confidence that is required by the Bayesian model. In that case, the Bayesian model could propose to obtain that same signal again but as an additional query derived signal (e.g., via a questionnaire/survey).

At 510, the at least one additional technographic signal and the additional query derived signal are obtained. In some embodiments, the additional technographic signals and additional query derived signals are obtained in a sequence that is determined based on their rankings.

At 512, the Bayesian model is updated based at least in part on the additional technographic signal and an additional query derived signal. The obtained additional technographic signals and additional query derived signals are combined with previously obtained signals of the model to update the model. Updating the model includes updating the assessment nodes in the model with the obtained additional signals, which ultimately update the computation of the scenario node of the model (i.e., the probability that the particular exposure/attack/breach could occur for the given organization).

Figure 6:
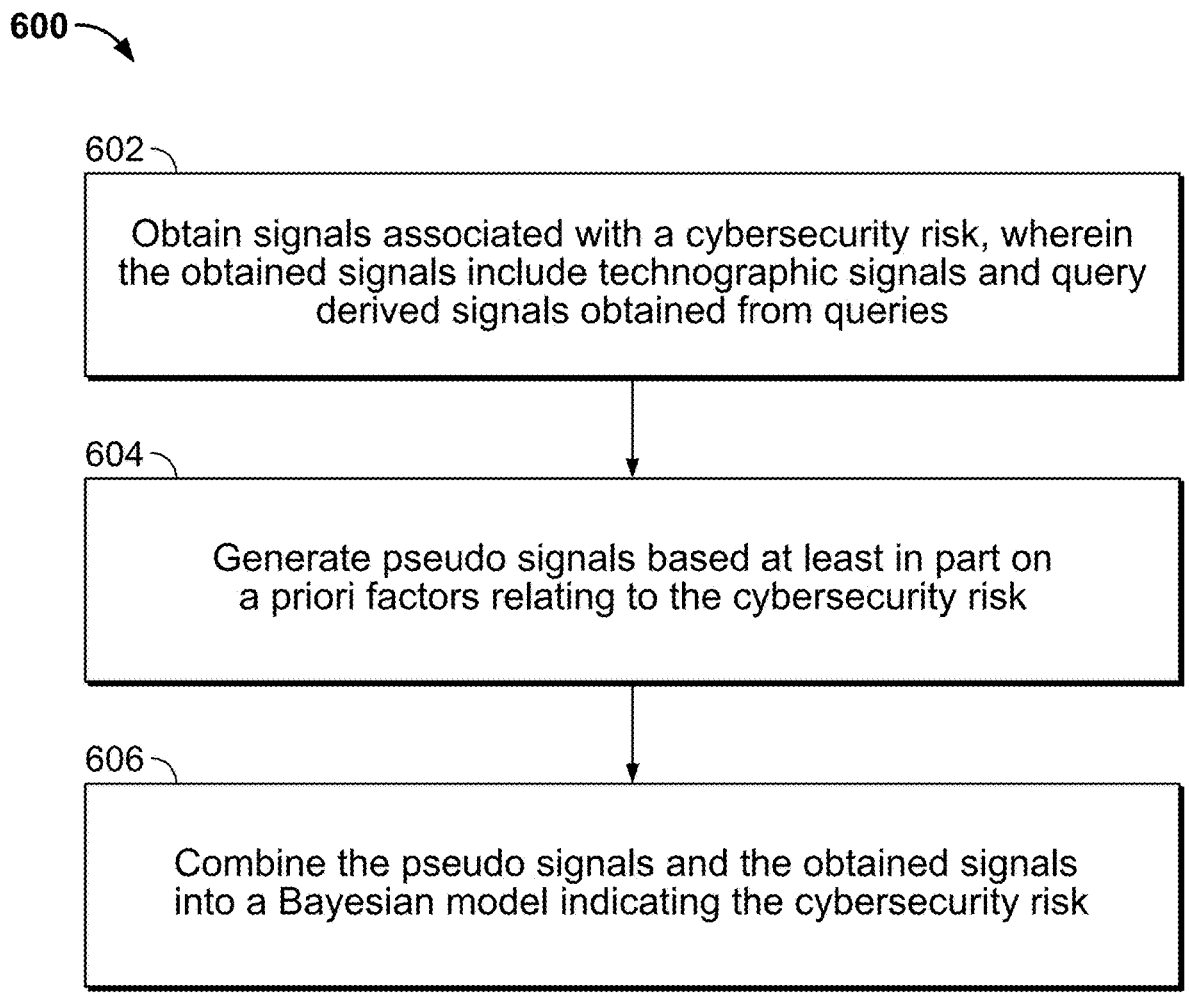
FIG. 6 is a flow diagram showing an embodiment of a process for determining a cybersecurity risk model using sparse data.

FIG. 6 is a flow diagram showing an embodiment of a process for determining a cybersecurity risk model using sparse data. In some embodiments, process 600 is implemented by cybersecurity risk modeling server 108 of system 100 of FIG. 1.

At 602, signals associated with a cybersecurity risk are obtained, wherein the obtained signals include technographic signals and query derived signals obtained from queries.

At 604, pseudo signals are generated based at least in part on a priori factors relating to the cybersecurity risk. In some embodiments, pseudo signals are generated for signals that were not available to be obtained as either technographic signals or query derived signals. In some embodiments, the distribution of probabilities corresponding to a set of possible input values of a pseudo signal can be determined by expert provided parameters and/or based on historically obtained/observed probabilities for that signal. Instead of omitting a signal that is unavailable to be determined as a technographic signal or as a query derived signal from the model of the cybersecurity risk, a pseudo signal is used to represent that signal in the model so that the model is unaffected by the potential sparseness of available signals.

At 606, the pseudo signals are combined with the obtained signals into a Bayesian model indicating the cybersecurity risk. Related technographic signals, query derived signals, and/or pseudo signals can be combined into a corresponding assessment node. In some embodiments, signals are combined into a corresponding assessment node using the respective distribution of probabilities corresponding to the sets of possible input values of the signals. Two or more assessment nodes, derived from the signals and/or other assessment nodes, are then combined to obtain the scenario node, which represents the cybersecurity risk. Specifically, the scenario node comprises a probability that a particular exposure/attack/breach could occur.

Figure 7:
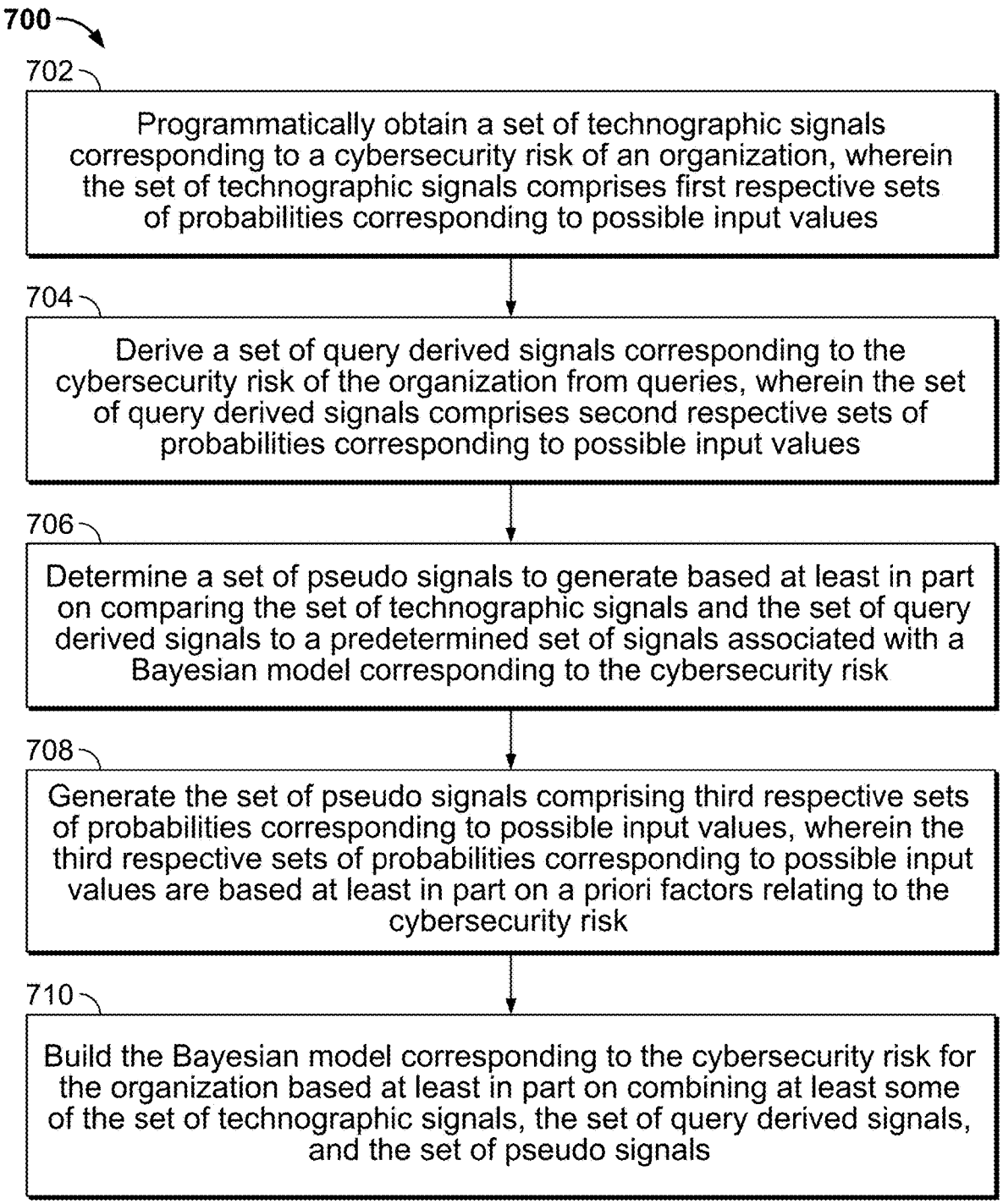
FIG. 7 is a flow diagram showing an example of a process for determining a cybersecurity risk model for an organization using sparse data.

FIG. 7 is a flow diagram showing an example of a process for determining a cybersecurity risk model for an organization using sparse data. In some embodiments, process 700 is implemented by cybersecurity risk modeling server 108 of system 100 of FIG. 1. In some embodiments, process 600 of FIG. 6 may be implemented, at least in part, by process 700.

At 702, a set of technographic signals corresponding to a cybersecurity risk of an organization is programmatically obtained, where the set of technographic signals comprises a first respective sets of probabilities corresponding to possible input values.

At 704, a set of query derived signals corresponding to the cybersecurity risk of an organization is derived from queries, where the set of query derived signals comprises a second respective sets of probabilities corresponding to possible input values.

At 706, a set of pseudo signals to generate is determined based at least in part on comparing the set of technographic signals and the set of query derived signals to a predetermined set of signals associated with a Bayesian model corresponding to the cybersecurity risk. For example, the set of pseudo signals is determined based on determining which signals of the predetermined set of signals associated with a Bayesian model corresponding to the cybersecurity risk as described in the set of configurations associated with the cybersecurity risk have not been successfully obtained as either a technographic signal or a query derived signal. Each of such signals that have not been successfully obtained as either a technographic signal or a query derived signal can be determined as a pseudo signal to generate.

At 708, the set of pseudo signals comprising third respective sets of probabilities corresponding to possible input values is generated, wherein the third respective sets of probabilities corresponding to possible input values are based at least in part on a priori factors relating to the cybersecurity risk. Each pseudo signal that is determined to be generated can be generated, for example, using a priori factors such as expert provided parameters and/or historically obtained/observed probabilities (e.g., corresponding to organizations that are similar to the organization for which the cybersecurity risk was being modeled).

At 710, the Bayesian model corresponding to the cybersecurity risk for the organization is built based at least in part on combining at least some of the set of technographic signals, the set of query derived signals, and the set of pseudo signals. As described above, two or more related signals (e.g., based on predetermined relationships between signals as described in the set of configuration information) can be combined using their respective sets of probabilities corresponding to input values to obtain an assessment node of the Bayesian probabilistic model for the cybersecurity risk. Any of a technographic signal, a query derived signal, and a pseudo signal can be combined with another instance of the same type of signal or one or more other types of signals to obtain an assessment node. In some instances, two or more related assessment nodes can be combined into additional assessment nodes in the model. Ultimately, the highest-level assessment nodes of the model are combined to obtain the scenario node, which is the root of the tree-structure of the model and represents the probability that a particular exposure/attack/breach could occur for the given organization.

Figure 8:
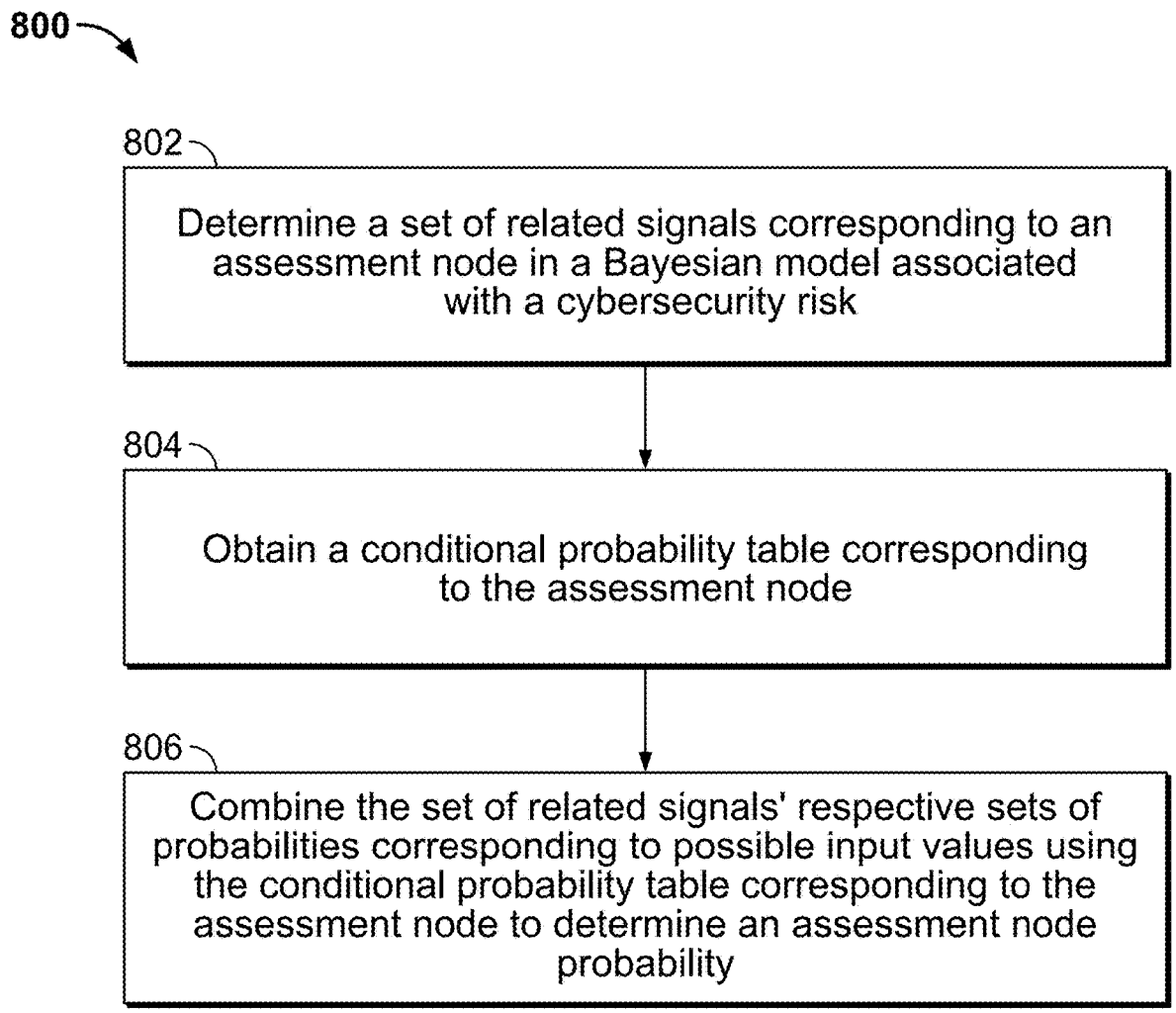
FIG. 8 is a flow diagram showing an embodiment of a process for combining a set of related signals to obtain an assessment node.

FIG. 8 is a flow diagram showing an embodiment of a process for combining a set of related signals to obtain an assessment node. In some embodiments, process 800 is implemented by cybersecurity risk modeling server 108 of system 100 of FIG. 1. In some embodiments, step 404 of process 400 of FIG. 4 or step 606 of process 600 of FIG. 6 can be generated using the example of process 800.

Process 800 describes an example aspect of building a cybersecurity risk model involving the combining of an obtained set of signals to obtain an assessment node of the model.

At 802, a set of related signals corresponding to an assessment node in a Bayesian model associated with a cybersecurity risk is determined. For example, which two or more signals (regardless if they are technographic, query derived, and/or pseudo) that have been determined for a cybersecurity risk associated with an organization are related and should be combined into an assessment node can be determined based on the predetermined relationships between signals associated with that cybersecurity risk.

At 804, a conditional probability table corresponding to the assessment node is obtained. The conditional probability table corresponding to the assessment node includes corresponding probabilities for each possible assessment value given each combination of possible input values across the signals that are to be combined for that assessment node. Because each signal is represented as a data point with a distribution of probabilities corresponding to the set of possible input values corresponding to that signal, the conditional probability table associated with an assessment node enables the probability distributions of the related signals to be considered in computing the assessment node. In some embodiments, a conditional probability table corresponding to each assessment node or the scenario node in the Bayesian model corresponding to a cybersecurity risk is precomputed (prior to the building of the model) and stored. An example of computing a conditional probability table for an assessment node is described in FIG. 9. As such, when determined signals are combined to build the model corresponding to the cybersecurity risk, the respective conditional probability table corresponding to each assessment node and the scenario node of the model is obtained from storage.

At 806, the set of related signals' respective sets of probabilities corresponding to possible input values is combined using the conditional probability table corresponding to the assessment node to determine an assessment node probability.

Figure 9:
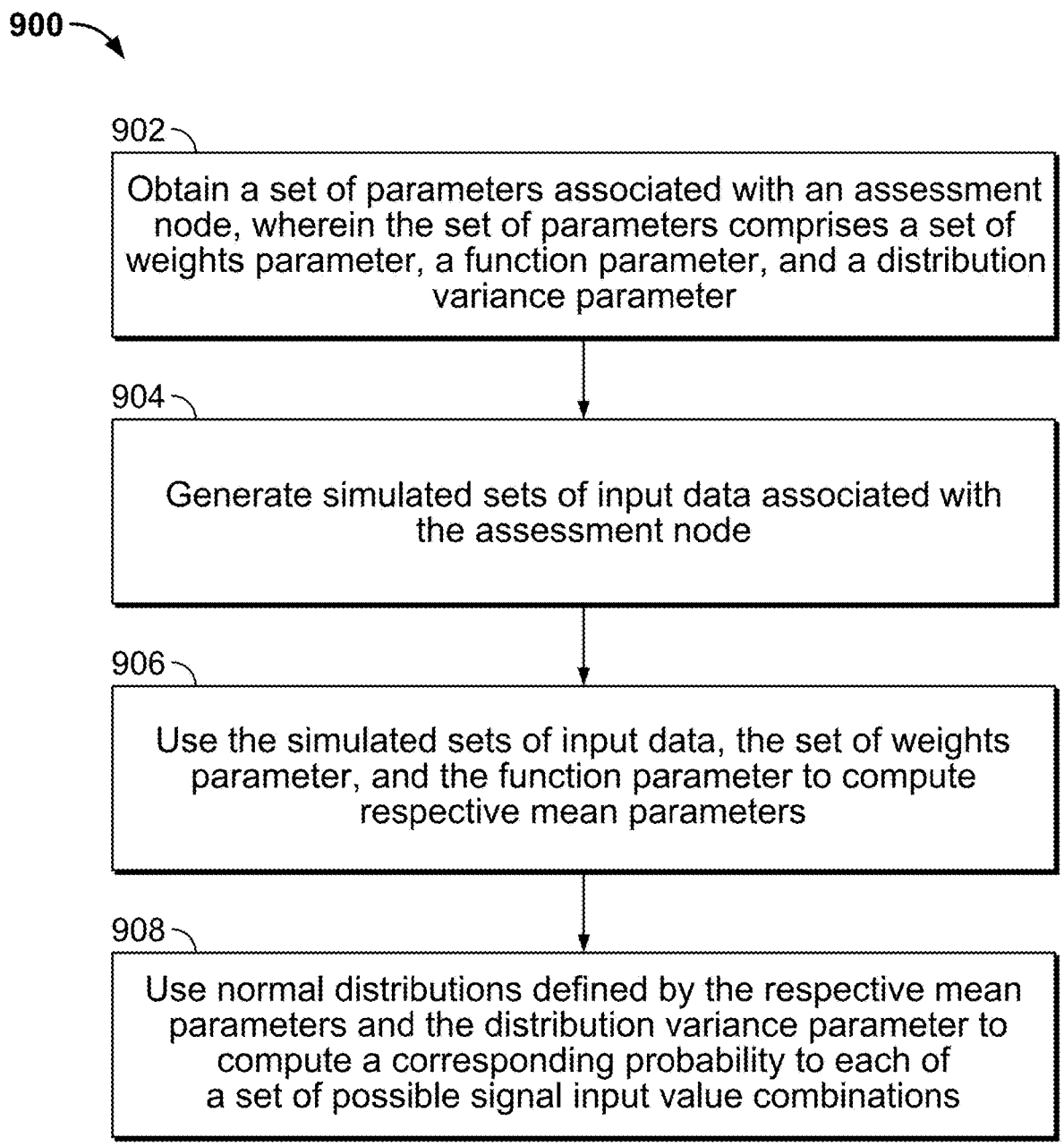
FIG. 9 is a flow diagram showing an example of a process for generating a conditional probability table corresponding to an assessment node in a model associated with a cybersecurity risk.

FIG. 9 is a flow diagram showing an example of a process for generating a conditional probability table corresponding to an assessment node in a model associated with a cybersecurity risk. In some embodiments, process 900 is implemented by cybersecurity risk modeling server 108 of system 100 of FIG. 1.

Process 900 describes one example technique by which to compute a conditional probability table corresponding to an assessment node. In some embodiments, process 900 may be implemented prior to signals being combined into assessment nodes of the model such as described in process 800 of FIG. 8.

At 902, a set of parameters associated with an assessment node is obtained, wherein the set of parameters comprises a set of weights parameter, a function parameter, and a distribution variance parameter. In some embodiments, the set of parameters is defined by experts for the specific assessment node. In some embodiments, the "set of weights" parameter includes a relative number associated with inputs into an assessment node. In some embodiments, the "function" parameter includes one of a weighted mean, a weighted maximum, a weighted minimum, or a weighted min-max. In some embodiments, the "distribution variance" parameter includes a number indicating the spread of the distribution across assessment values. In some embodiments, in addition to the set of parameters, each signal (that is to be combined to result in the assessment node) is associated with a numeric range of its possible input values.

At 904, simulated sets of input data associated with the assessment node are generated. In some embodiments, the set of parameters and the mapped numeric ranges to each signal's possible input values are input into a Ranked Nodes Method to simulate sets of input data, where each simulated set of input data includes a combination of one possible input value from each input signal into the assessment.

At 906, the simulated sets of input data, the set of weights parameter, and the function parameter are used to compute respective mean parameters. Each simulated set of input data is used with the set of parameters to compute a respective mean parameter.

At 908, normal distributions defined by the respective mean parameters and the distribution variance parameter are used to compute a corresponding probability to each of a set of possible signal input value combinations. A normal distribution is defined by the respective mean parameter associated with each simulated set of input data to compute the probability corresponding to a combination of possible signal input values. The corresponding probability to each of a set of possible signal input value combinations is included in the conditional probability table for the assessment node.

Figure 10A:
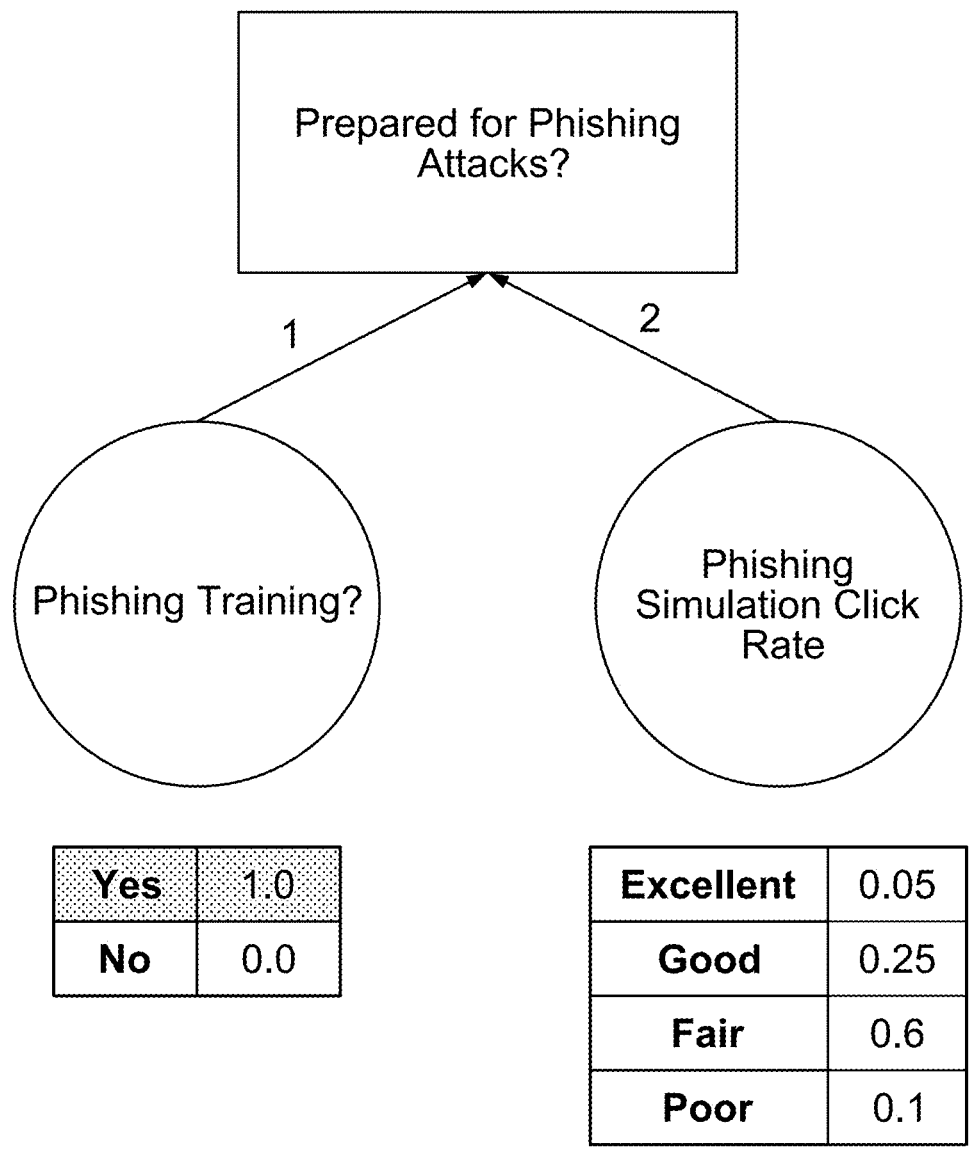
FIG. 10A shows two example obtained signals that are to be combined into an assessment node.

The following is an example description of computing a conditional probability table (using a process such as process 900 of FIG. 9) that references the example signals and the example assessment node described in FIGS. 10A, 10B, 10C, 10D, and 10E:

FIG. 10A shows two example obtained signals that are to be combined into an assessment node. In the example of FIG. 10A, the two signals are "Phishing Training?" and "Phishing Simulation Click Rate" and the related signals are to be combined to determine the assessment node "Prepared for Phishing Attacks?" In the example of FIG. 10A, the "Phishing Training?" signal was obtained for an organization as either a technographic signal or a query derived signal with high certainty and as such, its distribution of probabilities includes a 1.0 for the input value of "Yes" and 0 for the input value of "No." The "Phishing Simulation Click Rate" signal was not available to be obtained as either a technographic signal or a query derived signal and as such, the signal was generated as a pseudo signal and includes a distribution of probabilities (0.05 for "Excellent," 0.25 for "Good," 0.6 for "Fair," and 0.1 for "Poor") that was generated based on a priori factors.

In order to compute the answer to the question of the assessment node, "Prepared for Phishing Attacks?" given a set of input signal values, a conditional probability table corresponding to the assessment node is needed. FIG. 10B shows an example of conditional probability table for the assessment node, "Prepared for Phishing Attacks?". The example conditional probability table of FIG. 10B gives the probabilities that employees of the organization are prepared (and, correspondingly, not prepared) for a phishing attack, given the two input signals. For example, if it is determined that the organization does have training in place and has an excellent click rate, then the probability that the organization is prepared is 0.95 (top row). The most likely (highest probability) assessment for each row of inputs is highlighted in gray.

Figure 10C:
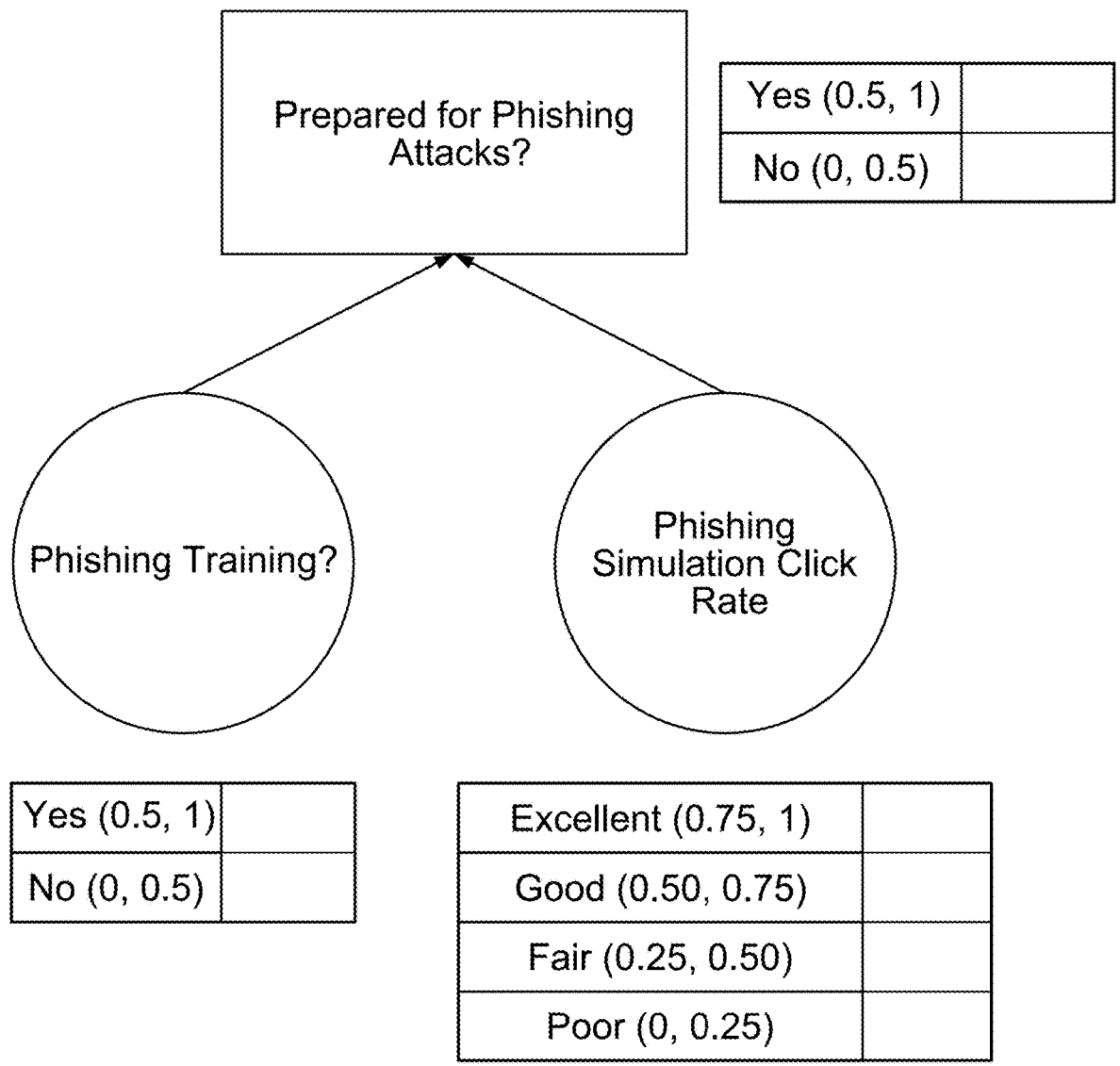
FIG. 10C shows example numeric ranges of each possible input value associated with the "Phishing Training?" assessment node and each of the signals, "Phishing Training?" and "Phishing Simulation Click Rate."

One example technique to use to compute the conditional probability table for an assessment node is the Ranked Nodes Method, which uses a limited set of expert defined parameters. With the Ranked Nodes Method, experts need to define the following three parameters for each assessment node (e.g., "Prepared for Phishing Attacks?"):

set of weights: relative number associated with each input into an assessment node function: one of weighted mean, weighted max, weighted min, or weighted min-max distribution variance: number indicating the spread of the distribution across assessment values Before introducing a numeric approach to filling in the conditional probability table using these parameters, each of the ordinal data inputs is mapped to/associated with corresponding numeric ranges. It is ensured that high numbers and low numbers have the same interpretation across nodes. For example, a high value for the "Phishing Training?" assessment node corresponds to training being in place and lower risk. Similarly, a high input value for the "Phishing Simulation Click Rate" signal corresponds to an excellent click rate (that is, a low click rate before a conversion is made to the ordinal Excellent) and lower risk. FIG. 10C shows example numeric ranges of each possible input value associated with the "Phishing Training?" assessment node and each of the signals, "Phishing Training?" and "Phishing Simulation Click Rate." For example, the numeric ranges of each possible input value can be determined by dividing the overall numeric range from 0 to 1 into a number of ordinal signal value bins. For example, there are four ordinal bins for "Phishing Simulation Click Rate," so each ordinal bin gets ¼, or 0.25 of the space between 0 and 1. The number of ordinal bins is defined based on analytic configurations. Given the mappings from ordinal variables to numeric ranges and the set of parameters that are shown in FIG. 10C, the Ranked Nodes Method:

(1) simulates a set of input data,
(2) uses the simulated input data, weights, and function to compute a mean parameter, and then
(3) uses a normal distribution defined by the mean and variance to compute the probability of each possible assessment node value.

For each combination of input data, this process is repeated for several samples. The results are used to compile a conditional probability table for the assessment node. First, the parameters are discussed below:

Weights are simple—they are relative numbers associated with each input data value. For example, the weight on "Phishing Training?" may be 1.0 and the weight on "Phishing Simulation Click Rate" may be 2.0. In some embodiments, the system may use one of four functions to use to compute the mean values that define how distributions are computed over assessment values, including: weighted mean, weighted max, weighted min, and a weighted average of the minimum and maximum. The weighted mean is used in the example. The third parameter is the variance, which defines how spread out or narrow the distributions across assessment values should be. If the variance is very high, then the distribution is spread flatter. In the current example described in FIGS. 10A, 10B, 10C, 10D, and 10E, a high variance parameter would mean that it is possible that employees both are and are not "Prepared for Phishing Attacks?," even when the two data inputs are known. A smaller variance would mean that, given the data inputs, it is very probable or very improbable that employees are "Prepared for Phishing Attacks?" That is, variance is like a confidence measure—the higher the variance, the more uniform the distribution is across possible assessment value probabilities, and the lower the variance the more certain the model will be of its assessment answer. In the current example below, the variance=0.01, which is relatively small, indicating a high confidence, or low spread.

Now an example of a single simulation is discussed, for one combination of input data values: Consider the case where "Phishing Training?" has the input value "Yes" and "Phishing Simulation Click Rate" has the input value "Excellent." Refer to the numeric ranges of FIG. 10C that indicate that the ordinal value of the input value of "Yes" for the "Phishing Training" signal corresponds to a numeric range between 0.5 and 1 and the ordinal input value of "Excellent" for the "Phishing Simulation Click Rate" signal corresponds to a numeric range between 0.75 and 1. In order to compute a numeric mean for the distribution across the assessment node values, numeric values are sampled from each of these two ranges. Three (note that this number is a system configuration) samples are taken from each of these ranges and, for each, a weighted mean_sample is computed using the weights of 1.0 on "Phishing Training?" and 2.0 on "Phishing Simulation Click Rate," which is shown in table 1002 of FIG. 10D. FIG. 10D shows example tables that include the weighted means computed for various samples of the probabilities corresponding to a combination of two possible signal input values for the "Prepared for Phishing Attacks?" assessment node and the corresponding computed probabilities of the assessment node values.

Now, each of the samples and the variance parameter=0.01 are used to define a normal distribution across assessment node values, and then the probability that "Prepared for Phishing Attacks?" will have an input value of "Yes" (that is, a value between 0.5 and 1) or "No" (that is, a value between 0 and 0.5), given the inputs ("Yes", "Excellent") are computed. Simply looking up these probabilities in the probability density functions defined by a parameter yields the probabilities shown in table 1004 of FIG. 10D.

Finally, to compute the overall probability that "Prepared for Phishing Attacks?"="Yes," given "Phishing Training?"="Yes" and "Phishing Simulation Click Rate"="Excellent," the simple average of the probabilities across all samples is computed, which yields the row in the initial target conditional probability table, which is shown in FIG. 10E.

This sampling process is repeated across all combinations of input values to fill out the conditional probability table. All parent weights are iteratively set to 1.0 except one and a weighted mean is computed. Then, the minimum weighted average across those computed values is taken. Again, using the set of weights parameter, the function parameter for computing mean values, and the variance parameter, the system automatically repeats the above process for each line in the conditional probability table for each assessment node. The computed conditional probability tables corresponding to an assessment node can be stored.

Referring back to the example obtained signal distributions of probabilities for the possible signal input values of FIG. 10A of two signals ("Phishing Training?" and "Phishing Simulation Click Rate") and the example computed conditional probability table for the assessment node ("Prepared for Phishing Attacks?") of FIG. 10B, the following is an example process by which to combine the two signals to obtain an assessment probability associated with the assessment node:

The probability that an organization is "Yes" for the "Prepared for Phishing Attacks?" assessment node can be determined as follows using the following formula:

$$p(\text{prepared}) = \Sigma_{i \in inputs} p(i) * p(\text{prepared}|i) \quad (1)$$

Where the inputs are all possible combinations of input values across all the input signals. In the current example, the input combinations correspond to the eight rows in the conditional probability above. However, given that "Phishing Training?" has the input value of "Yes" (due to the "Yes" having an associated probability of 1.0), only four input combinations have non-zero probabilities:

$$p(\text{prepared}) = p(\text{yes,excellent}) * p(\text{prepared}|\text{yes,excellent}) + p(\text{yes,good}) * p(\text{prepared}|\text{yes,good}) + p(\text{yes,fair}) * p(\text{prepared}|\text{yes,fair}) + p(\text{yes,poor}) * p(\text{prepared}|\text{yes,poor})$$

$$p(\text{prepared}) = (1.0 * 0.05 * 0.95) + (1.0 * 0.25 * 0.9) + (1.0 * 0.6 * 0.7) + (1.0 * 0.1 * 0.5)$$

$$p(\text{prepared}) = 0.74$$

One advantage of this type of model is the ability to interpret and expose the probability that is computed at any assessment node. In this current example, the "Prepared for Phishing Attack?" assessment node is determined to have a probability of 0.74 for the assessment value of "Yes" and a probability of 0.26 for the assessment value of "No" (i.e., this organization has a probability of 0.74 of being prepared for a phishing attack). In some embodiments, rules can be configured to bucket probabilities and give the organization a color-based (e.g., green/yellow/red) rating, or rules could be configured to make specific technical suggestions if probabilities do not exceed a particular value.

The math for computing assessment node probabilities is the same no matter where in the cybersecurity risk model the assessment node lives. Put another way, two or more assessment nodes (or assessment node and signals) can be combined to obtain a higher-level assessment node in the model similar to how signals are combined to obtain an assessment node, as described above: combine assessment node input values with associated probabilities with the probabilities for each combination of inputs in the conditional probability table that was precomputed for the resulting, higher-level assessment node.

Figure 11:
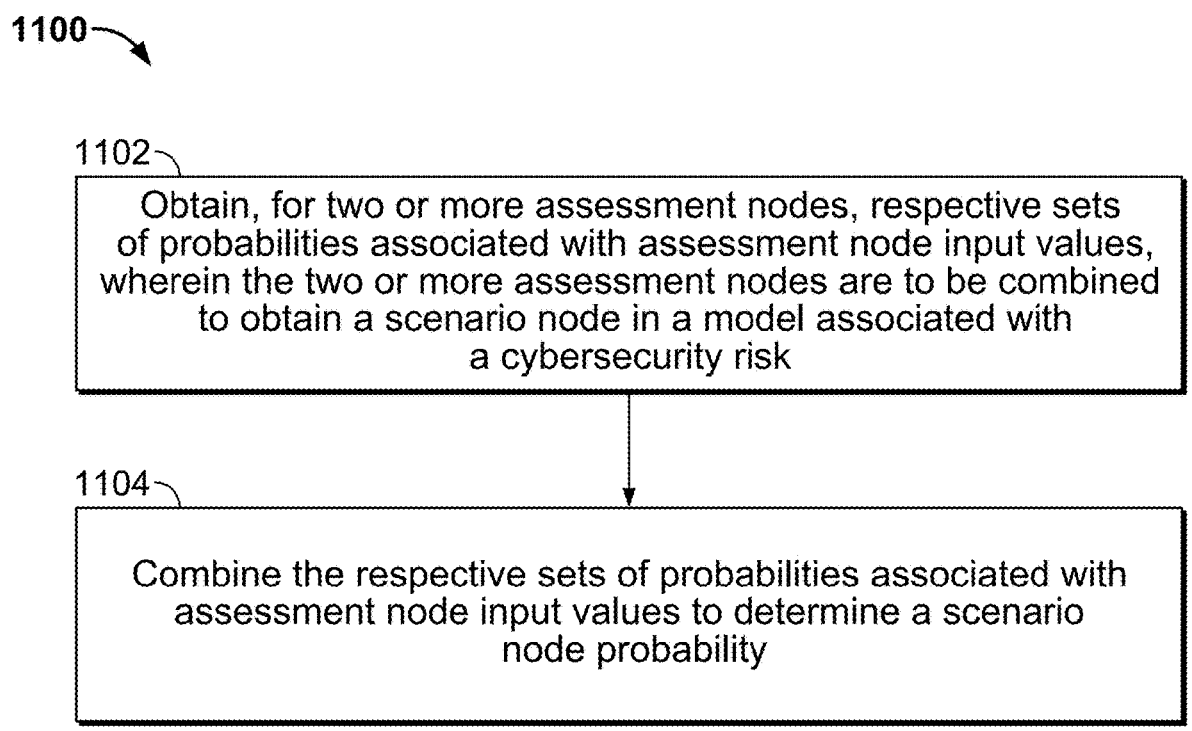
FIG. 11 is a flow diagram showing an example process for combining assessment nodes into a scenario node of a cybersecurity model.

FIG. 11 is a flow diagram showing an example process for combining assessment nodes into a scenario node of a cybersecurity model. In some embodiments, process 1100 is implemented by cybersecurity risk modeling server 108 of system 100 of FIG. 1.

At 1102, for two or more assessment nodes, respective sets of probabilities associated with assessment node input values are obtained, wherein the two or more assessment nodes are to be combined to obtain a scenario node in a model associated with a cybersecurity risk. As described above, each assessment node comprises a set/distribution of probabilities corresponding to a set of possible input values associated with the assessment node. As described above, the highest assessment level in a model of a cybersecurity risk is the incident scenario itself. In some embodiments, which assessment nodes of the model are to be combined to obtain the scenario node is determined based on the set of configuration information associated with the cybersecurity risk associated with the model.

At 1104, the respective assessment node probabilities are combined to determine a scenario node probability. In some embodiments, two or more assessment nodes are combined to obtain the scenario node of the model in the same way that two or more signals are combined to obtain an assessment node or the way that two or more assessment nodes are combined to obtain a higher-level assessment node, which is that the sets of probabilities of the input assessment nodes are combined with the probabilities corresponding to each combination of input values that are included in a conditional probability table associated with the scenario node.

Figure 12:
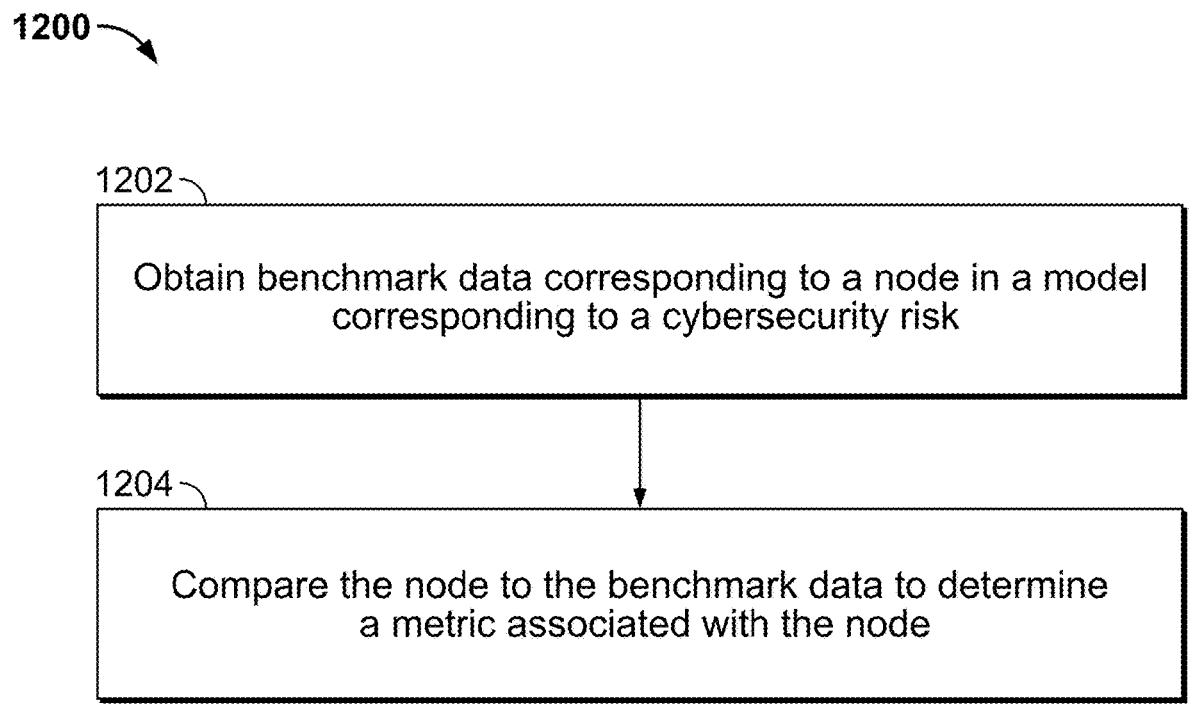
FIG. 12 is a flow diagram showing an example process for determining a percentile associated with a node of a cybersecurity model.

FIG. 12 is a flow diagram showing an example process for determining a percentile associated with a node of a cybersecurity model. In some embodiments, process 1200 is implemented by cybersecurity risk modeling server 108 of system 100 of FIG. 1.

At 1202, benchmark data corresponding to a node in a model corresponding to a cybersecurity risk is obtained. As described above, a node in the model can be a signal, an assessment node, or a scenario node. In some embodiments, the benchmark data comprises an industry standard associated with a node. In some embodiments, the benchmark data that comprises an industry standard associated with a node is determined based on historical data associated with organizations that are similar to the given organization. In some embodiments, the benchmark data that comprises an industry standard associated with a node is determined based on a predictive model (e.g., a machine learning model that is trained using security data).

At 1204, the node is compared to the benchmark data to determine a metric associated with the node. The distribution of probabilities associated with the set of possible input values of the node is compared against the benchmark data to determine a metric for the given organization with respect to that node. For example, the metric is a "percentile." In some embodiments, the percentile of the node is presented with the presentation of the model at a user interface as one or more of text, color, and/or a size associated with the representation of the node.

Figure 13:
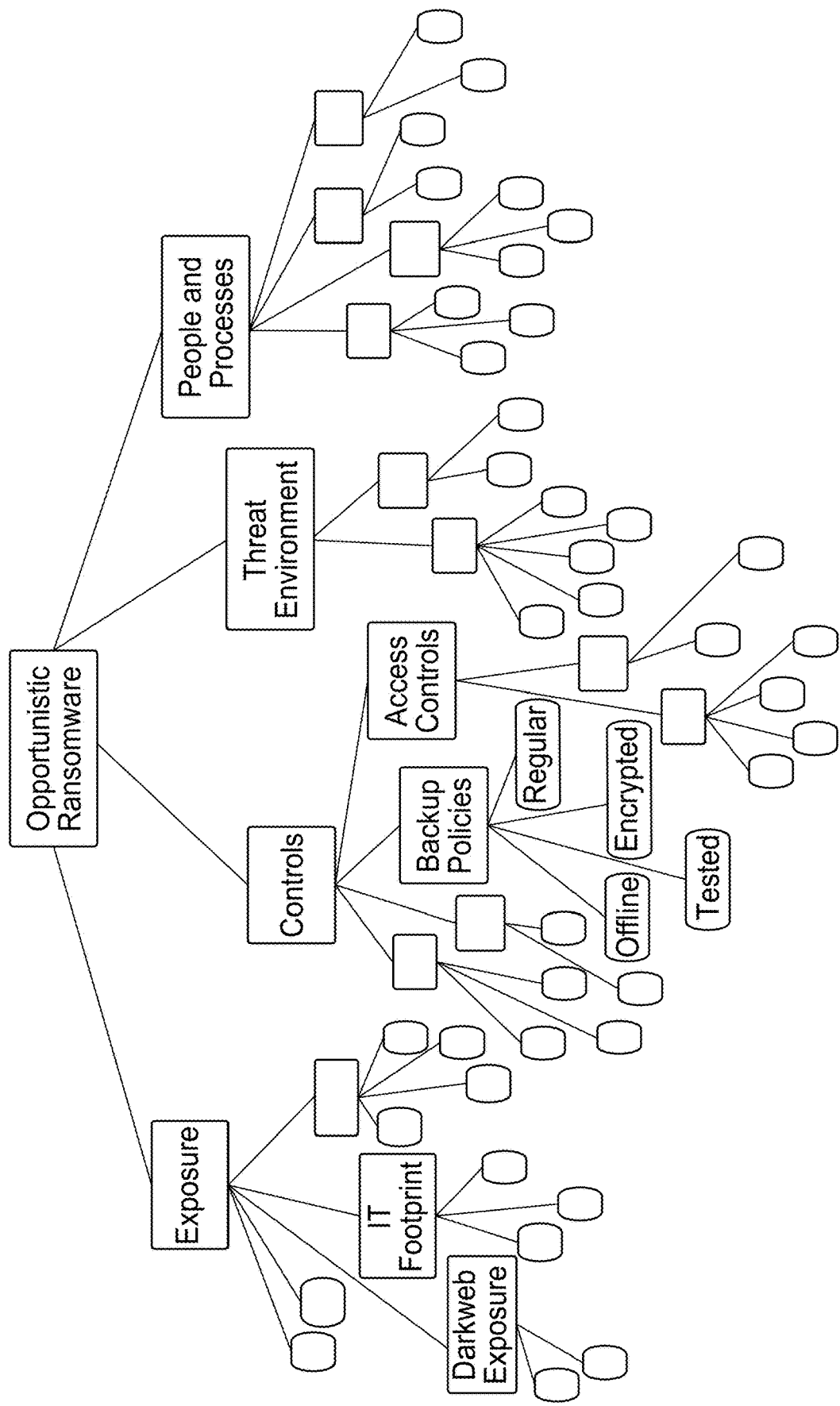
FIG. 13 is a diagram showing an example model for an example cybersecurity risk associated with an organization.

FIG. 13 is a diagram showing an example model for an example cybersecurity risk associated with an organization. FIG. 13 shows a Bayesian probabilistic model that is built for the cybersecurity risk that is the probability of an "opportunistic ransomware" incident occurring for the organization. In some embodiments, the relationships between the nodes (e.g., which signal nodes are to be combined into which assessment nodes, which assessment nodes are to be combined into which other higher-level assessment nodes, and which assessment nodes are to be combined into the root scenario node) are described in a set of configuration information associated with the model for the "opportunistic ransomware" cybersecurity risk. As shown in the example model of FIG. 13, two obtained signal nodes (leaf nodes) are combined to obtain the "DarkWeb Exposure" assessment node and three obtained signal nodes (leaf nodes) are combined to obtain the "IT Footprint" assessment node. The "Dark Web Exposure" and "IT Footprint" assessment nodes are combined with other signals and assessment nodes to obtain the higher-level "Exposure" assessment node. Signal nodes (leaf nodes) "Offline," "Tested," "Encrypted," and "Regular" related to types of data backup policies are combined to obtain the "Backup Policies" assessment node. The "Access Controls" assessment node is obtained from the combination of two assessment nodes in a lower level, and each of those two assessment nodes are obtained from combining respective sets of obtained signal nodes (leaf nodes). The "Backup Policies" and "Access Controls" assessment nodes are combined with other assessment nodes to obtain the higher-level "Controls" assessment node. The "Threat Environment" assessment node is obtained from the combination of two assessment nodes in a lower level, and each of those two assessment nodes are obtained from combining respective sets of obtained signal nodes (leaf nodes). The "People and Processes" assessment node is obtained from the combination of four assessment nodes in a lower level, and each of those four assessment nodes are obtained from combining respective sets of obtained signal nodes (leaf nodes). The "Exposure," "Controls," "Threat Environment," and "People and Processes" assessment nodes are combined to obtain the root, scenario node "Opportunistic Ransomware." Because each leaf signal node that was input into the model includes a respective set of probabilities corresponding to a set of possible input values, each assessment node that was combined from a set of related signals also includes a respective set of probabilities corresponding to a set of possible assessment values, and ultimately, the scenario node includes at least one probability of the likelihood (the cybersecurity risk) that the "Opportunistic Ransomware" will occur for the given organization.

Figure 14:
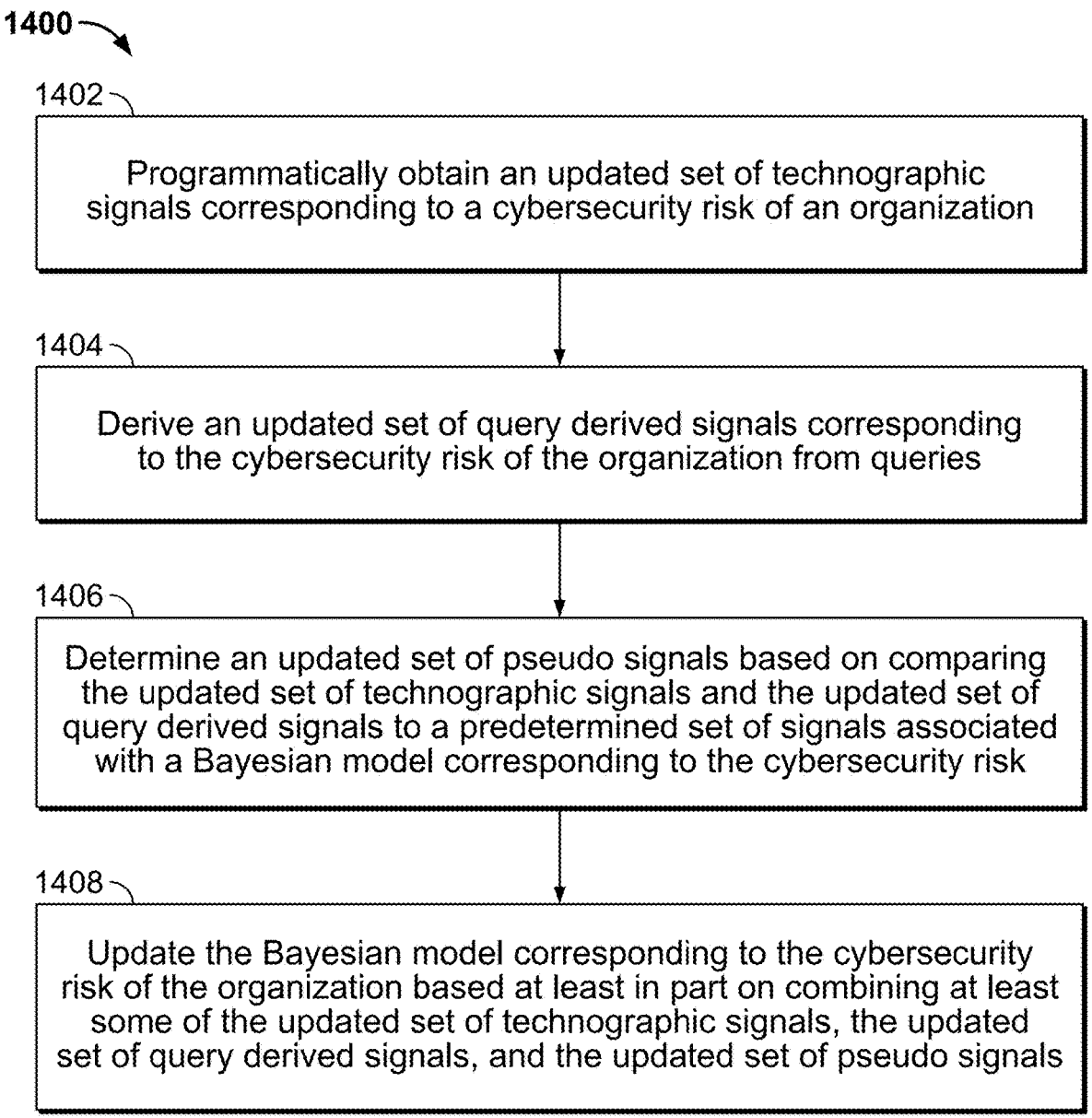
FIG. 14 is a flow diagram showing an example process for updating a cybersecurity model.

FIG. 14 is a flow diagram showing an example process for updating a cybersecurity model. In some embodiments, process 1400 is implemented by cybersecurity risk modeling server 108 of system 100 of FIG. 1.

Process 1400 shows an example process of obtaining updated signals corresponding to a cybersecurity risk and then generating an updated model corresponding to the cybersecurity risk based on the updated signals. As such, the model corresponding to the cybersecurity risk can be maintained up-to-date, over time, even as signals change.

At 1402, an updated set of technographic signals corresponding to a cybersecurity risk of an organization is obtained. For example, API commands corresponding to one or more data source servers are executed again to obtain updated technographic signals.

At 1404, an updated set of query derived signals corresponding to the cybersecurity risk of the organization is derived from queries. For example, updated and/or new queries (e.g., questionnaires) that have been completed by the organization are reviewed again for updated query derived signals.

At 1406, an updated set of pseudo signals is determined based on comparing the updated set of technographic signals and the updated set of query derived signals to a predetermined set of signals associated with a Bayesian model corresponding to the cybersecurity risk. For example, any signal that is included in the configuration information's set of predetermined signals of the cybersecurity risk model that is not obtained as either a technographic signal or as a query derived signal is generated as a pseudo signal based on a priori factors.

At 1408, the Bayesian model corresponding to the cybersecurity risk of the organization is updated based at least in part on combining at least some of the updated set of technographic signals, the updated set of query derived signals, and the updated set of pseudo signals. Related updated signals are combined to obtain assessment nodes, assessment nodes may be combined to obtain higher-level assessment nodes, and the highest-level assessment nodes are ultimately combined to determine the updated scenario node, which represents the updated cybersecurity risk/probability of the occurrence of a particular breach/attack/exposure for the given organization.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
obtain signals associated with a cybersecurity risk, wherein the obtained signals include technographic signals and query derived signals obtained from queries;
combine the technographic signals and the query derived signals into a Bayesian model indicating the cybersecurity risk, wherein to combine the technographic signals and the query derived signals into the Bayesian model indicating the cybersecurity risk comprises to:
use the technographic signals and the query derived signals as leaf nodes in the Bayesian model; and
identify a set of related signals from the technographic signals and the query derived signals to combine into an assessment node of the Bayesian model according to a set of configuration information associated with the cybersecurity risk, wherein the set of configuration information associated with the cybersecurity risk describes predetermined relationships among the signals associated with the cybersecurity risk; and
determine additional technographic signals or additional query derived signals associated with the cybersecurity risk to obtain such that the additional technographic signals or the additional query derived signals are to be computed to impact the cybersecurity risk, wherein to determine the additional technographic signals or the additional query derived signals comprises to:
determine a distribution of probabilities across a set of possible input values associated with an obtained technographic signal; and
in response to a determination that the distribution of probabilities across the set of possible input values associated with the obtained technographic signal is associated with low confidence, determine an additional query derived signal to be obtained; and
a memory coupled to the processor and configured to provide the processor with instructions.

2. The system of claim 1, wherein the processor is configured to obtain the technographic signals associated with an organization by querying one or more data source servers via one or more application programming interfaces (APIs).

3. The system of claim 1, wherein the processor is configured to obtain the query derived signals associated with an organization including by performing character recognition on query responses provided by the organization.

4. The system of claim 1, wherein to combine the technographic signals and the query derived signals into the Bayesian model indicating the cybersecurity risk comprises to:
combine the set of related signals into the assessment node of the Bayesian model.

5. The system of claim 4, wherein to combine the set of related signals into the assessment node of the Bayesian model comprises to:
obtain a conditional probability table corresponding to the assessment node; and
combine the set of related signals' respective sets of probabilities corresponding to possible input values using the conditional probability table corresponding to the assessment node to determine an assessment node probability.

6. The system of claim 4, wherein the processor is further configured to combine two or more assessment nodes into a scenario node of the Bayesian model, wherein the scenario node comprises the cybersecurity risk.

7. The system of claim 1, wherein the determination of the additional technographic signals or the additional query derived signals associated with the cybersecurity risk to obtain is based at least in part on one or more of the following: an already obtained technographic signal or an already obtained query derived signal, the assessment node that has been determined by combining a set of related signals from the technographic signals and the query derived signals, and a signal that was attempted but not successfully obtained as a technographic signal.

8. The system of claim 1, wherein the processor is further configured to:
determine rankings corresponding to the additional technographic signals or the additional query derived signals associated with the cybersecurity risk to obtain; and
obtain the additional technographic signals or the additional query derived signals associated with the cybersecurity risk in a sequence that is determined based at least in part on the determined rankings.

9. The system of claim 8, wherein the rankings corresponding to the additional technographic signals or the additional query derived signals associated with the cybersecurity risk to obtain are determined based on impact weights corresponding to the additional technographic signals or the additional query derived signals associated with the cybersecurity risk to obtain, wherein the impact weights are determined based at least in part on one or more of the following: an organization type associated with an organization associated with the Bayesian model, predetermined impact weights, and a cybersecurity risk type associated with the cybersecurity risk.

10. The system of claim 1, wherein the processor is configured to:
obtain at least one of the additional technographic signals or the additional query derived signals associated with the cybersecurity risk to obtain; and
update the Bayesian model associated with the cybersecurity risk using the obtained at least one of the additional technographic signals or the additional query derived signals.

11. The system of claim 1, wherein the processor is configured to:
obtain benchmark data corresponding to a node in the Bayesian model; and
compare the node to the benchmark data to determine a metric associated with the node.

12. A method, comprising:
obtaining signals associated with a cybersecurity risk, wherein the obtained signals include technographic signals and query derived signals obtained from queries;
combining the technographic signals and the query derived signals into a Bayesian model indicating the cybersecurity risk, wherein combining the technographic signals and the query derived signals into the Bayesian model indicating the cybersecurity risk comprises:
using the technographic signals and the query derived signals as leaf nodes in the Bayesian model; and
identifying a set of related signals from the technographic signals and the query derived signals to combine into an assessment node of the Bayesian model according to a set of configuration information associated with the cybersecurity risk, wherein the set of configuration information associated with the cybersecurity risk describes predetermined relationships among the signals associated with the cybersecurity risk; and
determining additional technographic signals or additional query derived signals associated with the cybersecurity risk to obtain such that the additional technographic signals or the additional query derived signals are to be computed to impact the cybersecurity risk, wherein determining the additional technographic signals or the additional query derived signals comprises:
determining a distribution of probabilities across a set of possible input values associated with an obtained technographic signal; and
in response to a determination that the distribution of probabilities across the set of possible input values associated with the obtained technographic signal is associated with low confidence, determining an additional query derived signal to be obtained.

13. The method of claim 12, further comprising obtaining the technographic signals associated with an organization by querying one or more data source servers via one or more application programming interfaces (APIs).

14. The method of claim 12, further comprising obtaining the query derived signals associated with an organization including by performing character recognition on query responses provided by the organization.

15. The method of claim 12, wherein combining the technographic signals and the query derived signals into the Bayesian model indicating the cybersecurity risk comprises:
combining the set of related signals into the assessment node of the Bayesian model.

16. The method of claim 15, wherein combining the set of related signals into the assessment node of the Bayesian model comprises:
obtaining a conditional probability table corresponding to the assessment node; and
combining the set of related signals' respective sets of probabilities corresponding to possible input values using the conditional probability table corresponding to the assessment node to determine an assessment node probability.

17. The method of claim 15, further comprising combining two or more assessment nodes into a scenario node of the Bayesian model, wherein the scenario node comprises the cybersecurity risk.

18. The method of claim 12, wherein the determination of the additional technographic signals or the additional query derived signals associated with the cybersecurity risk to obtain is based at least in part on one or more of the following: an already obtained technographic signal or an already obtained query derived signal, the assessment node that has been determined by combining a set of related signals from the technographic signals and the query derived signals, and a signal that was attempted but not successfully obtained as a technographic signal.

19. The method of claim 12, further comprising:
determining rankings corresponding to the additional technographic signals or the additional query derived signals associated with the cybersecurity risk to obtain; and
obtaining the additional technographic signals or the additional query derived signals associated with the cybersecurity risk in a sequence that is determined based at least in part on the determined rankings.

20. A computer program product, the computer program product being embodied in a non-transitory computer-readable storage medium and comprising computer instructions for:
obtaining signals associated with a cybersecurity risk, wherein the obtained signals include technographic signals and query derived signals obtained from queries;
combining the technographic signals and the query derived signals into a Bayesian model indicating the cybersecurity risk, wherein combining the technographic signals and the query derived signals into the Bayesian model indicating the cybersecurity risk comprises:
using the technographic signals and the query derived signals as leaf nodes in the Bayesian model; and
identifying a set of related signals from the technographic signals and the query derived signals to combine into an assessment node of the Bayesian model according to a set of configuration information associated with the cybersecurity risk, wherein the set of configuration information associated with the cybersecurity risk describes predetermined relationships among the signals associated with the cybersecurity risk; and
determining additional technographic signals or additional query derived signals associated with the cybersecurity risk to obtain such that the additional technographic signals or the additional query derived signals are to be computed to impact the cybersecurity risk, wherein determining the additional technographic signals or the additional query derived signals comprises:
  determining a distribution of probabilities across a set of possible input values associated with an obtained technographic signal; and
  in response to a determination that the distribution of probabilities across the set of possible input values associated with the obtained technographic signal is associated with low confidence, determining an additional query derived signal to be obtained.

* * * * *